US00RE50248E

(19) United States
(12) Reissued Patent
Shibata et al.

(10) Patent Number: US RE50,248 E
(45) Date of Reissued Patent: Dec. 31, 2024

(54) HORIZONTAL ARTICULATED ROBOT

(71) Applicant: KAWASAKI JUKOGYO KABUSHIKI KAISHA, Kobe (JP)

(72) Inventors: Takeshi Shibata, Akashi (JP); Yukimasa Yamada, Himeji (JP); Yuya Muroi, Himeji (JP)

(73) Assignee: KAWASAKI JUKOGYO KABUSHIKI KAISHA, Kobe (JP)

(21) Appl. No.: 18/526,217

(22) Filed: Dec. 1, 2023

Related U.S. Patent Documents

Reissue of:
(64) Patent No.: 11,198,216
Issued: Dec. 14, 2021
Appl. No.: 15/734,642
PCT Filed: Jun. 6, 2019
PCT No.: PCT/JP2019/022554
§ 371 (c)(1),
(2) Date: Dec. 3, 2020
PCT Pub. No.: WO2019/244657
PCT Pub. Date: Dec. 26, 2019

(30) Foreign Application Priority Data

Jun. 19, 2018 (JP) ..... 2018-116365
Aug. 10, 2018 (JP) ..... 2018-151774

(51) Int. Cl.
*B25J 9/06* (2006.01)
*B65G 47/90* (2006.01)

(52) U.S. Cl.
CPC ..... *B25J 9/06* (2013.01); *B65G 47/90* (2013.01)

(58) Field of Classification Search
CPC ... B25J 9/042; B25J 9/043; B25J 9/06; B65G 47/90
See application file for complete search history.

(56) References Cited

U.S. PATENT DOCUMENTS

2015/0321345 A1 11/2015 Hahakura et al.

FOREIGN PATENT DOCUMENTS

| | | | | | |
|---|---|---|---|---|---|
| JP | 2003136442 | A | * | 5/2003 | ..... B25J 9/10 |
| JP | 2015-211998 | A | | 11/2015 | |
| JP | 2021048289 | A | * | 3/2021 | ..... H01L 21/677 |
| KR | 10-2012-0114704 | A | | 10/2012 | |
| KR | 2012114704 | A | * | 10/2012 | |
| WO | 2014/102887 | A1 | | 7/2014 | |
| WO | WO-201402887 | A1 | * | 7/2014 | ..... H01L 21/67742 |

* cited by examiner

*Primary Examiner* — William E Dondero
(74) *Attorney, Agent, or Firm* — Oliff PLC

(57) ABSTRACT

A horizontal articulated robot is provided, which includes a first connecting part disposed between two of the arms and rotatably connecting the other arm to one arm, a second connecting part disposed between a pedestal and the arm and rotatably connecting the arm to the pedestal, and a ring member disposed between the first connecting part and the arm and formed so that, as compared with one of end part sides in an extending direction of the arms, a height dimension thereof becomes larger at the other end part side.

15 Claims, 29 Drawing Sheets

HORIZONTAL ARTICULATED ROBOT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. application Ser. No. 15/734,642, filed Jun. 6, 2019, now U.S. Pat. No. 11,198, 216.*

TECHNICAL FIELD

The present disclosure relates to a horizontal articulated robot.

BACKGROUND ART

Suspended or ceiling-mounted SCARA robots are known, which includes a pedestal, a first arm, a second arm, and a movable shaft provided to the second arm so as to be movable in the gravitational direction (for example, see Patent Document 1).

In the robot disclosed in Patent Document 1, a second reinforcement part which is comprised of a ring-shaped plate made of steel is provided, in order to increase the rigidity of a second connecting part which connects the first arm and the second arm.

REFERENCE DOCUMENT OF CONVENTIONAL ART

[Patent Document]
[Patent Document 1] JP2015-211998A

DESCRIPTION OF THE DISCLOSURE

Problems to be Solved by the Disclosure

Meanwhile, Patent Document 1 describes that when the rigidity of the second reinforcement part is increased, the first arm tends to be bent due to an increase in the weight. The bending in the first arm causes a deviation of the robot from taught position coordinates when the robot is operated, and therefore, the operating accuracy of the robot may be reduced. Moreover, since an amount of displacement by the bending (an amount of deviation from the taught position coordinates) varies depending on the posture of the robot, a teaching work may become complicated.

The present disclosure is made in view of solving the above problems, and one purpose thereof is to provide a horizontal articulated robot which fixes an amount of displacement due to bending, and suppresses lowering in an operating accuracy of the robot, and increases in an efficiency of a teaching work by an operator.

SUMMARY OF THE DISCLOSURE

In order to solve the conventional problem, a horizontal articulated robot according to one aspect of the present disclosure is a horizontal articulated robot having a pedestal and a plurality of arms, which includes a first connecting part disposed between two of the arms and rotatably connecting the other arm to one arm, a second connecting part disposed between the pedestal and the arm and rotatably connecting the arm to the pedestal, and a ring member disposed between the first connecting part and the arm and formed so that, as compared with one of end part sides in an extending direction of the arms, a height dimension thereof becomes larger at the other end part side.

According to this configuration, an amount of displacement due to bending of the arms can be made constant to suppress lowering in an operating accuracy of the robot and increase in an efficiency of a teaching work by an operator.

A horizontal articulated robot according to one aspect of the present disclosure is a horizontal articulated robot having a pedestal and a plurality of arms, which includes a first connecting part disposed between two of the arms and rotatably connecting the other arm to one arm, a second connecting part disposed between the pedestal and the arm and rotatably connecting the arm to the pedestal, and a ring member disposed between the first connecting part and the arm and formed so that, as compared with one of end part sides in an extending direction of the arms, a height dimension thereof becomes larger at the other end part side.

According to this configuration, the amount of displacement due to the bending of the arms can be made constant to suppress the lowering in the operating accuracy of the robot and increase in the efficiency of the teaching work by the operator.

The above-described purpose, other purposes, features, and advantages of the present disclosure will become clear from detailed description of preferred embodiments described below with reference to the accompanying drawings.

Effect of the Disclosure

According to the horizontal articulated robot of the present disclosure, the amount of displacement due to the bending of the arms can be made constant to suppress the lowering in the operating accuracy of the robot and increase in the efficiency of the teaching work by the operator.

MODES FOR CARRYING OUT THE DISCLOSURE

Figure 1:
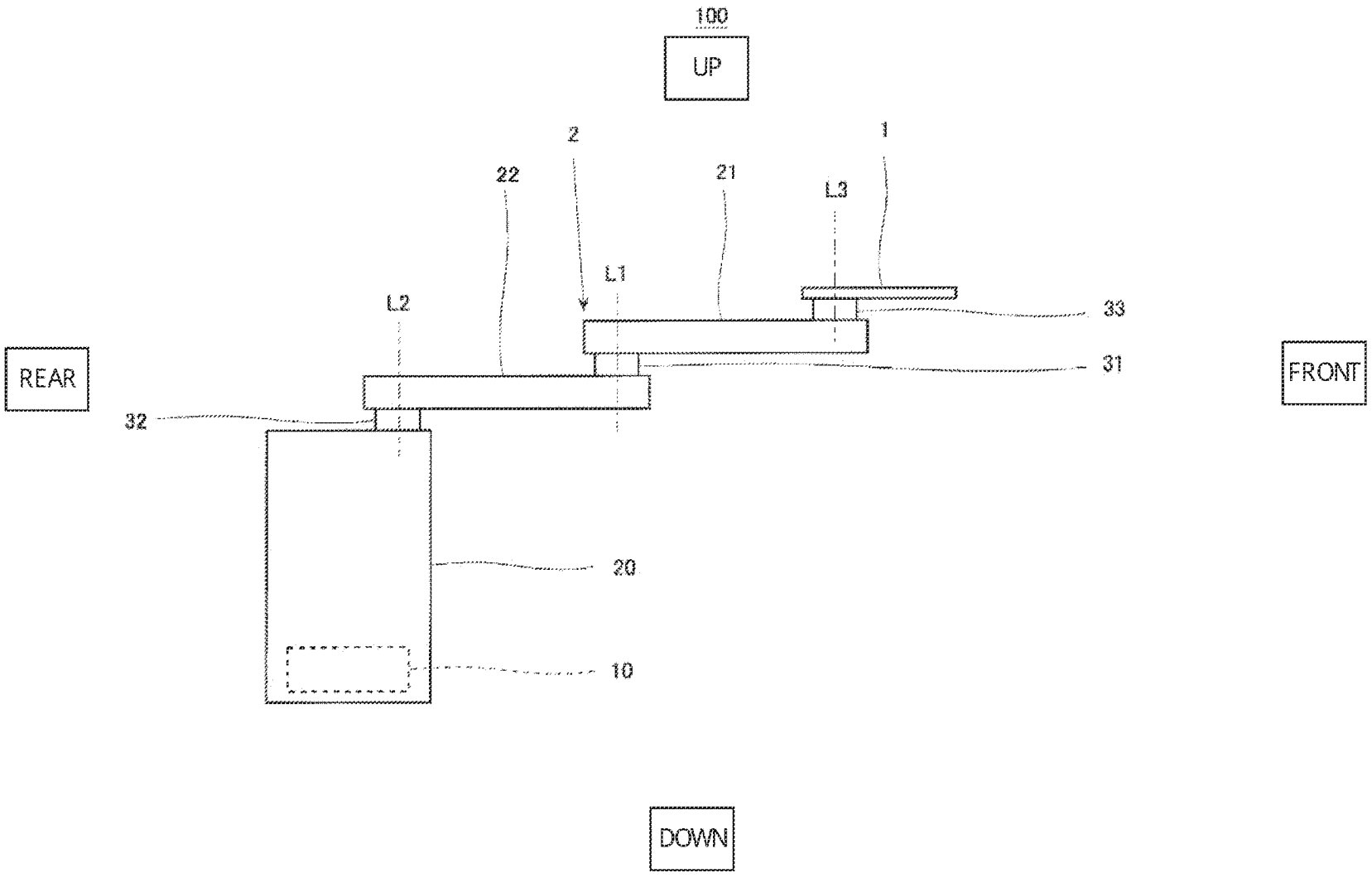
FIG. 1 is a front view schematically illustrating an outline configuration of a horizontal articulated robot according to Embodiment 1.

Hereinafter, desirable embodiments of the present disclosure will be described with reference to the drawings. Note that, below, the same reference characters are assigned to the same or corresponding components throughout the drawings to omit redundant description. Moreover, throughout the drawings, components which are needed to explain the present disclosure are selectively illustrated, and illustration of other components may be omitted. Moreover, the present disclosure is not limited to the following embodiments.

The horizontal articulated robot according to Embodiment 1 is a horizontal articulated robot including a pedestal and a plurality of arms. The horizontal articulated robot includes a first connecting part disposed between two arms, and rotatably connecting the other arm to one arm, a second connecting part disposed between the pedestal and the arm, and rotatably connecting the arm to the pedestal, a ring member disposed between the first connecting part and the arm, and formed so that, as compared with one of end part sides in an extending direction of the arms, its height dimension becomes larger at the other end part side.

Alternatively, in the horizontal articulated robot according to Embodiment 1, the horizontal articulated robot may be installed on a floor surface, and the ring member may be formed so that its height dimension becomes larger at a tip-end-part side of the arm, as compared with a base-end-part side.

Alternatively, in the horizontal articulated robot according to Embodiment 1, the ring member may have a first ring member disposed between the one arm and the first connecting part, and a second ring member disposed between the first connecting part and the other arm.

Alternatively, in the horizontal articulated robot according to Embodiment 1, the first ring member may be formed to have a height dimension so that an angle between an axial center of the other arm at the base-end-part side and an imaginary line extending in the vertical direction may become a given first angle set in advance.

Alternatively, in the horizontal articulated robot according to Embodiment 1, the second ring member may be formed to have a height dimension so that the axial center of the other arm at the tip-end-part side is oriented in the vertical direction.

Alternatively, in the horizontal articulated robot according to Embodiment 1, at least one of the first connecting part and the second connecting part may be provided with a sealing member which seals an interior space of the connecting part.

Alternatively, in the horizontal articulated robot according to Embodiment 1, the horizontal articulated robot may be disposed inside a vacuum chamber.

Hereinafter, one example of the horizontal articulated robot according to Embodiment 1 is described with reference to FIGS. 1 to 6.

[Configuration of Horizontal Articulated Robot]

FIG. 1 is a front view schematically illustrating an outline configuration of a horizontal articulated robot according to Embodiment 1. Note that, in FIG. 1, the up-and-down direction and the front-and-rear direction of the horizontal articulated robot are expressed as the up-and-down direction and the front-and-rear direction illustrated in the drawing.

As illustrated in FIG. 1, the horizontal articulated robot 100 according to Embodiment 1 includes a hand 1, a manipulator 2, and a control device 10, and is configured to hold and convey a workpiece by the hand 1. The workpiece may be, for example, a semiconductor wafer. Note that the configuration of the hand 1 may be any kind of form, as long as it is capable of holding and conveying the workpiece.

Moreover, the horizontal articulated robot 100 according to Embodiment 1 is installed on the floor surface.

The manipulator 2 includes a pedestal 20, a plurality of arms (here, a first arm (the other arm) 21 and a second arm (one arm) 22), a first connecting part 31, a second connecting part 32, and a third connecting part 33. The control device 10 is disposed inside the pedestal 20. Note that the control device 10 may be disposed outside the pedestal 20.

Moreover, the pedestal 20 is also provided with the second connecting part 32. The second connecting part 32 has, for example, a ball screw mechanism, a drive motor, a rotation sensor which detects a rotational position of the drive motor, and a current sensor which detects current for controlling rotation of the drive motor (none of them is illustrated), and the second connecting part 32 expands and contracts in the up-and-down direction and rotates the second arm 22. Note that the drive motor may be, for example, a servomotor which is servo-controlled by the control device 10. Moreover, the rotation sensor may be, for example, an encoder.

A base-end part of the second arm 22 is connected to the second connecting part 32 so as to be rotatable on a rotation axis L2 which passes through the axial center of the second connecting part 32. A tip-end part of the second arm 22 is connected, through the first connecting part 31, with a base-end part of the first arm 21 so that the first arm 21 is rotatable on a rotation axis L1. Note that a configuration of the first connecting part 31 will be described later.

Moreover, a tip-end part of the first arm 21 is connected, through the third connecting part 33, with the hand 1 so that the hand 1 is rotatable on a rotation axis L3. The third connecting part 33 has, for example, a drive motor, a rotation sensor which detects a rotational position of the drive motor, and a current sensor which detects current for controlling rotation of the drive motor (none of them is illustrated), and rotates (pivots) the hand 1.

The control device 10 includes a processor, such as a microprocessor and a CPU, and a memory, such as a ROM and a RAM (not illustrated). The memory stores information on a basic program, various fixed data, etc. The processor controls various operations of the horizontal articulated robot 100 by reading and executing software, such as the basic program stored in the memory.

Note that the control device 10 may be comprised of a sole control device 10 which carries out a centralized control, or may be comprised of a plurality of control devices 10 which collaboratively carry out a distributed control. Moreover, the control device 10 may be comprised of a microcomputer, or may be comprised of a MPU, a PLC (Programmable Logic Controller), a logic circuit, etc.

[Configuration of First Connecting Part]

Next, a configuration of the first connecting part 31 in the horizontal articulated robot 100 according to Embodiment 1 is described in detail with reference to FIG. 2.

Figure 2:
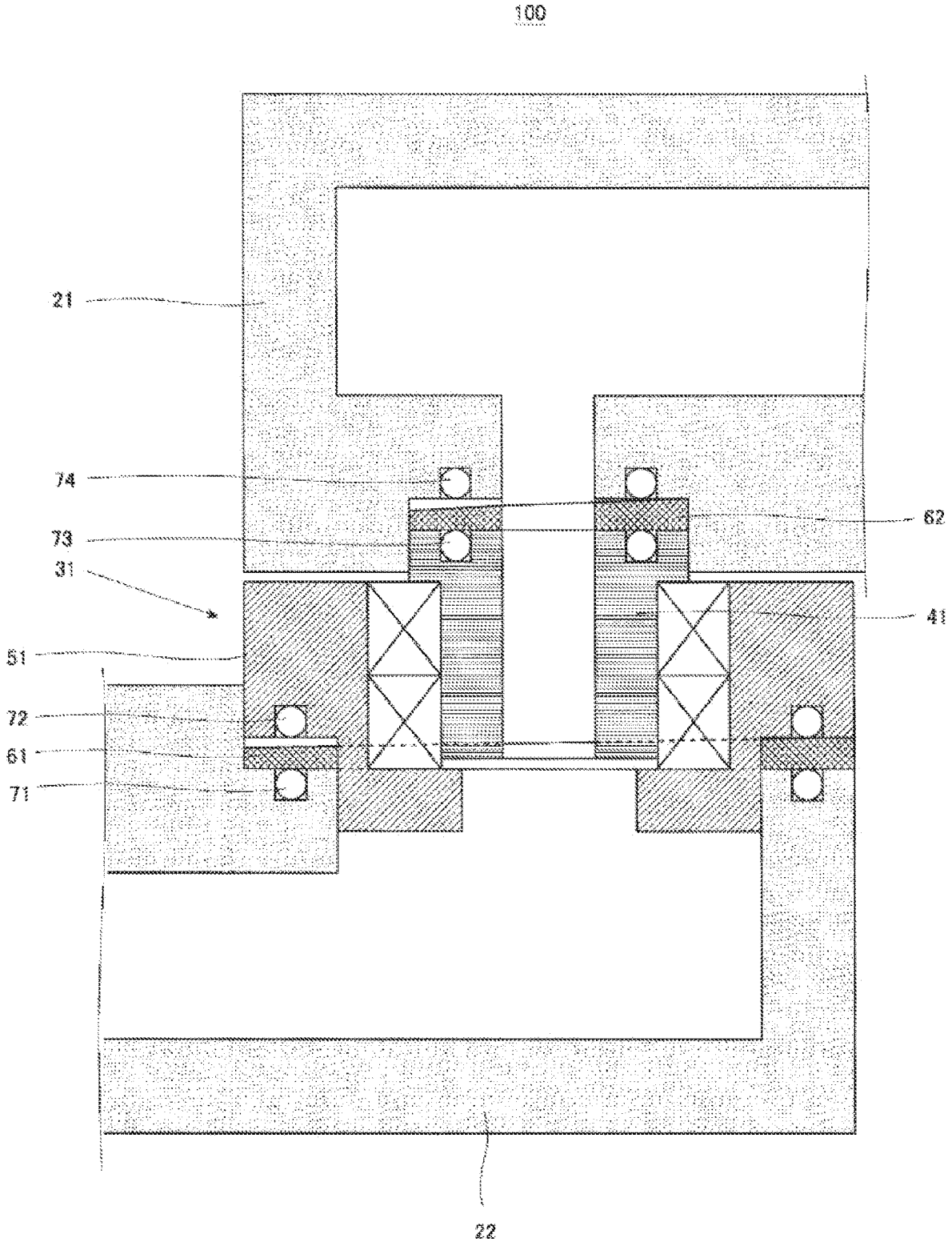
FIG. 2 is a cross-sectional view illustrating an outline configuration of a first connecting part in the horizontal articulated robot according to Embodiment 1.

FIG. 2 is a cross-sectional view illustrating an outline configuration of the first connecting part in the horizontal articulated robot according to Embodiment 1. Note that, in FIG. 2, in order to facilitate understandings of the present disclosure, a gap is formed between the ring member and the arm, but if the ring member and the arm are fastened by a suitable component, the gap will not be formed.

As illustrated in FIG. 2, the first connecting part 31 has a shaft member 41 and a bearing member 51. Moreover, a first ring member 61 and a second ring member 62, and sealing members 71 to 74 are disposed in the first connecting part 31.

The bearing member 51 is fixed at a lower end part to an upper end part of the second arm 22 by a suitable component (e.g., bolts). Moreover, a first ring member 61 having an annular shape is disposed between a lower end part of the bearing member 51 and an upper end part of the second arm 22. The first ring member 61 is fixed to the upper end part of the second arm 22 by a suitable component.

The first ring member 61 is formed so that the height dimension becomes larger at a tip-end-part side of the second arm 22, as compared with a base-end-part side of the second arm 22. In detail, for example, in terms of correcting bending of the second arm 22, the first ring member 61 may be formed so that the height dimension of the second arm 22 may become 0.1 to 1.0 mm larger at the tip-end-part side than at the base-end-part side.

Figure 4:
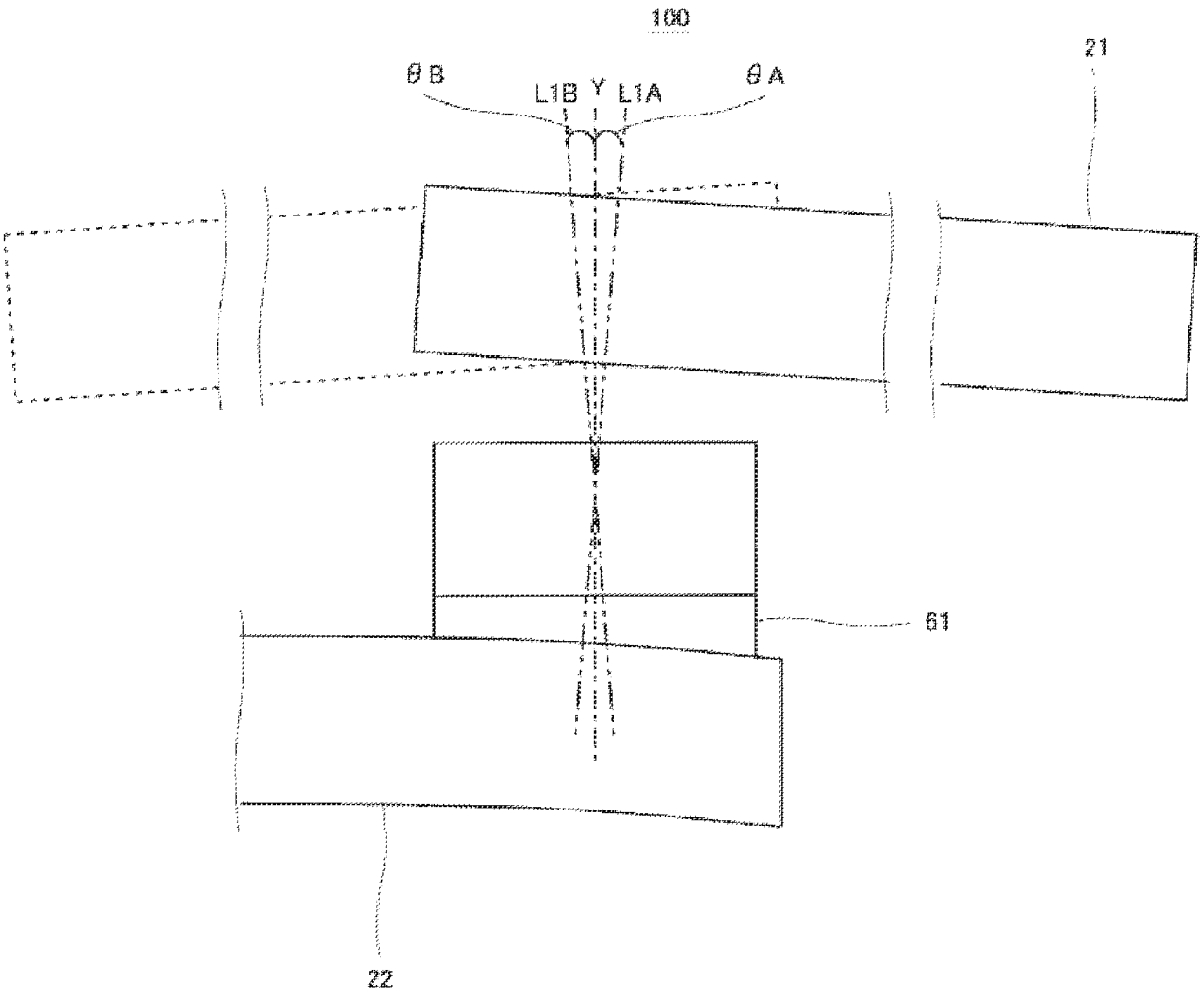
FIG. 4 is a schematic view illustrating a bending state of arms in the horizontal articulated robot according to Embodiment 1.

Alternatively, the first ring member 61 may be formed to have the height dimension so that an angle between the axial center of the first arm 21 at the base-end-part side and an imaginary line Y extending in the vertical direction becomes a given first angle set in advance (see FIG. 4).

In more detail, the first ring member 61 is formed to have the height dimension so that the angle between the axial center of the first arm 21 at the base-end-part side and the imaginary line Y becomes the first angle, regardless of the posture (rotational angle) of the first arm 21. Here, the first angle θ can be calculated in advance by an experiment etc., and, for example, it may be 0.05° to 0.3°.

Moreover, the first ring member 61 may be formed so that a lower end surface is horizontal when seen horizontally. Moreover, the first ring member 61 may be formed so that an upper end surface is inclined when seen horizontally.

The shaft member 41 is fixed at an upper end part to a lower end part of the first arm 21 by a suitable component (e.g., bolts). Moreover, the second ring member 62 having an annular shape is disposed between the upper end part of the shaft member 41 and the lower end part of the first arm 21. The second ring member 62 is fixed to the lower end part of the first arm 21 by a suitable component (e.g., bolts). Therefore, the second ring member 62 is rotatable with respect to the second arm 22 in connection with the rotation of the first arm 21.

The second ring member 62 is formed so that the height dimension becomes larger at the tip-end-part side of the first arm 21, as compared with the base-end-part side of the first arm 21. In detail, in terms of correcting bending of the first arm 21, for example, the second ring member 62 may be formed so that its height dimension at the tip-end-part side of the first arm 21 becomes 0.1 to 1.0 mm larger than its height dimension at the base-end-part side of the first arm 21.

Figure 5:
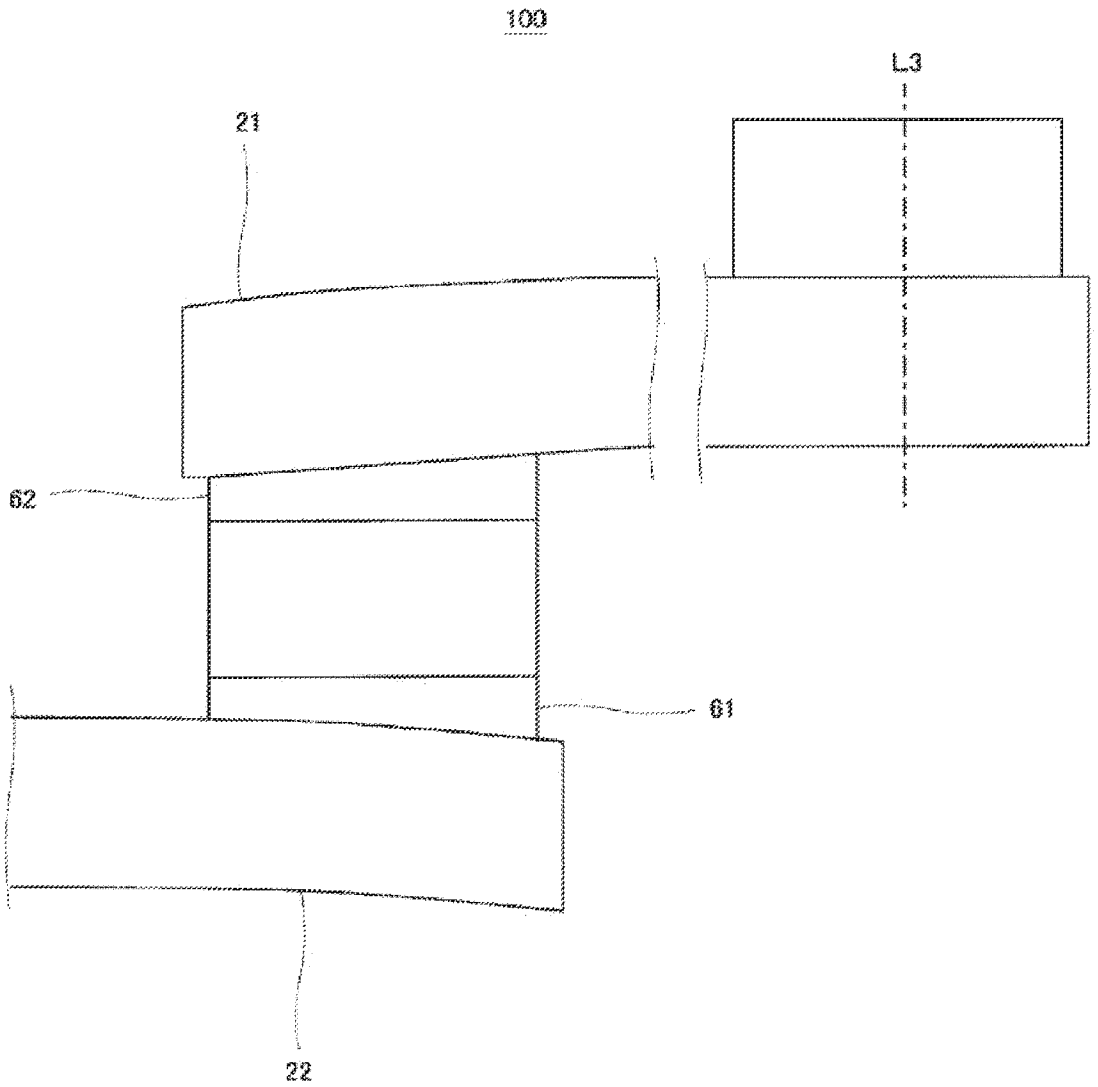
FIG. 5 is a schematic view illustrating a substantial part of the horizontal articulated robot according to Embodiment 1.
Figure 6:
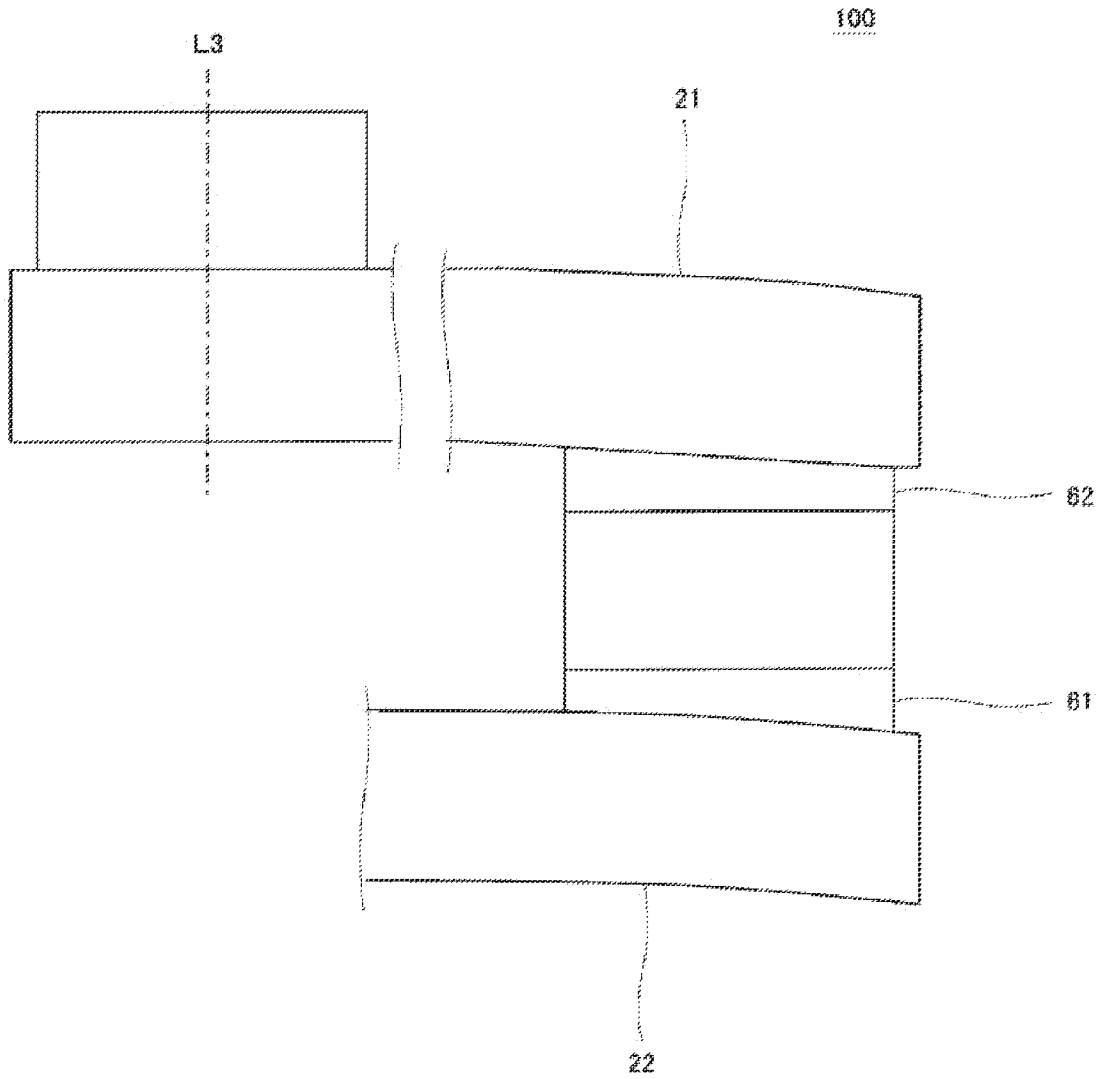
FIG. 6 is a schematic view illustrating the substantial part of the horizontal articulated robot according to Embodiment 1.

Alternatively, the second ring member 62 may be formed to have the height dimension so that the axial center of the first arm 21 at the tip-end part side is oriented in the vertical direction (see FIGS. 5 and 6). In other words, the second ring member 62 may be formed to have the height dimension so that the tip-end part of the first arm 21 becomes horizontal when seen horizontally.

Alternatively, the second ring member 62 may be formed so that the lower end surface becomes horizontal when seen horizontally. Alternatively, the second ring member 62 may be formed so that the upper end surface is inclined when seen horizontally.

Moreover, the sealing member 71 is disposed in the upper end part of the second arm 22, at a part which contacts the lower end surface of the first ring member 61. The sealing member 72 is disposed in the lower end part of the bearing member 51, at a part which contacts the upper end surface of the first ring member 61. As the sealing member 71 and the sealing member 72, O-rings may be used, for example.

Similarly, the sealing member 73 is disposed in the upper end part of the shaft member 41, at a part which contacts the lower end surface of the second ring member 62. Moreover, the sealing member 74 is disposed in the lower end part of the first arm 21, at a part which contacts the upper end surface of the second ring member 62. As the sealing member 73 and the sealing member 74, O-rings may be used, for example.

The sealing members 71 to 74 can maintain an interior space of the first connecting part 31 in a sealed state. Therefore, for example, when the horizontal articulated robot 100 is disposed inside the vacuum chamber, the airtightness of the vacuum chamber can be maintained.

[Operation and Effects of Horizontal Articulated Robot]

Next, operation and effects of the horizontal articulated robot 100 according to Embodiment 1 is described with reference to FIGS. 1 to 6.

[Operation and Effects of First Ring Member]

Figure 3:
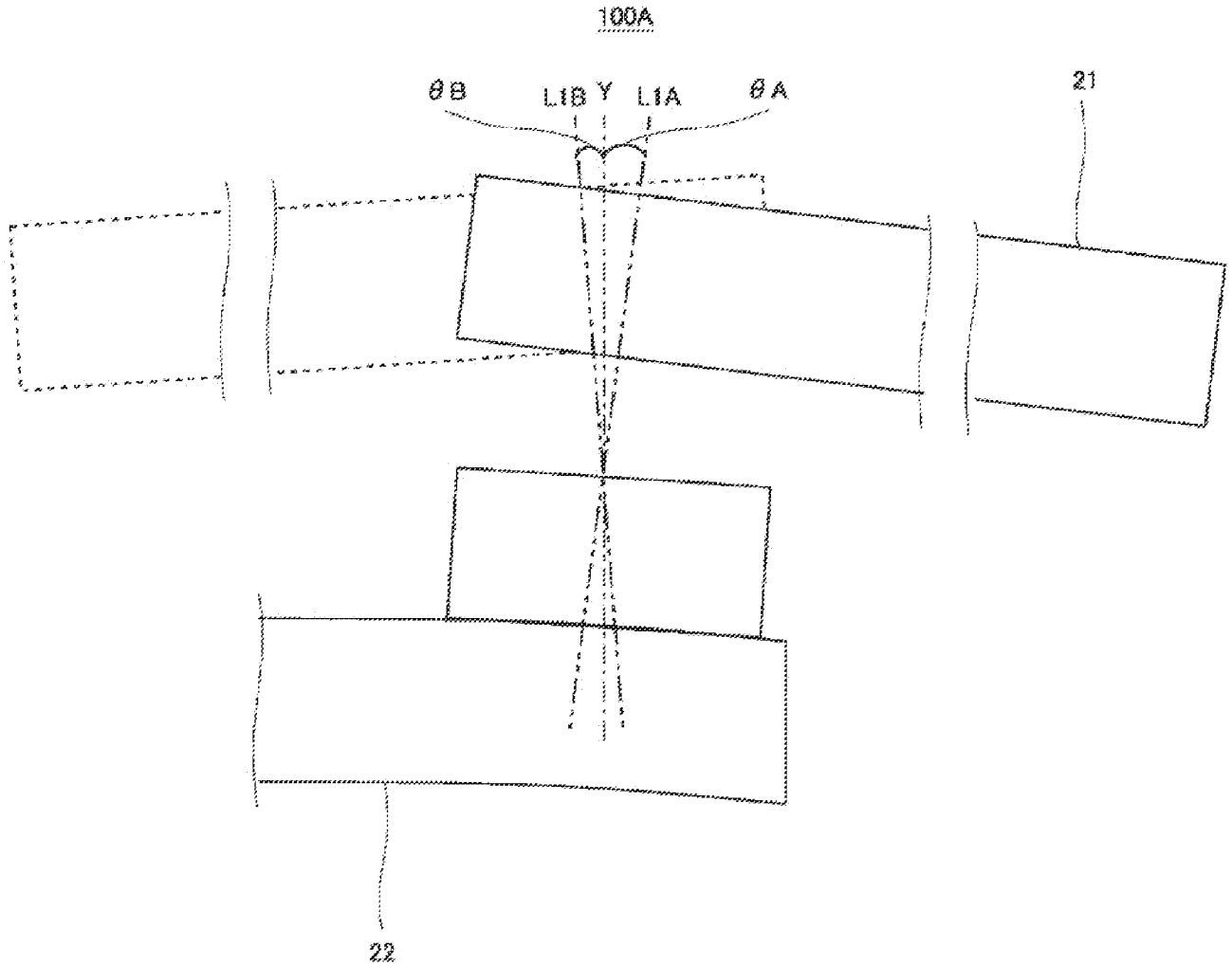
FIG. 3 is a schematic view illustrating a bending state of arms in a conventional horizontal articulated robot.

FIG. 3 is a schematic view illustrating a bending state of arms in a conventional horizontal articulated robot. FIG. 4 is a schematic view illustrating a bending state of the arms in the horizontal articulated robot according to Embodiment 1.

First, in FIGS. 3 and 4, a state where the tip-end part of the first arm 21 is distant from the tip-end part of the second arm 22 is defined as a first state. Moreover, when the first arm 21 is in the first state, an angle between the imaginary line Y extending in the vertical direction and an axial center L1A of the base-end part of the first arm 21 is defined as θA.

Similarly, a state where the tip-end part of the first arm 21 is close to the base-end part of the second arm 22 is defined as a second state. Moreover, when the first arm 21 is in the second state, an angle between the imaginary line Y and an axial center L1B of the base-end part of the first arm 21 is defined as θB.

As illustrated in FIG. 3, in a conventional horizontal articulated robot 100A, when the tip-end part of the first arm 21 is in the first state, an amount of bending of the first arm 21 is added to an amount of bending of the second arm 22. Therefore, the total amount of bending of the horizontal articulated robot 100A becomes larger when the tip-end part of the first arm 21 is in the first state, as compared with when the tip-end part of the first arm 21 is in the second state.

In other words, the angle θA between the imaginary line Y and the axial center L1A of the base-end part of the first arm 21 when the tip-end part of the first arm 21 is in the first state differs from the angle θB between the imaginary line Y and the axial center L1B of the base-end part of the first arm 21 when the tip-end part of the first arm 21 is in the second state.

That is, in the conventional horizontal articulated robot 100A, the amount of bending varies according to the posture of the robot. Therefore, since an amount of deviation of taught position coordinates differs depending on the posture of the robot, a teaching work by an operator may become complicated.

On the other hand, as illustrated in FIG. 4, in the horizontal articulated robot 100 according to Embodiment 1, the height dimension of the first ring member 61 is formed so as to be larger at the tip-end-part side of the second arm 22, as compared with the base-end-part side of the second arm 22.

Therefore, the bending of the second arm 22 can be corrected, and the effect to the first arm 21 due to the bending of the second arm 22 can be reduced.

Moreover, the amount of bending of the first arm 21 can be reduced when the tip-end part of the first arm 21 is in the first state, as compared with the conventional horizontal articulated robot 100A. Therefore, when the robot operates, the deviation from the taught position coordinates can be reduced, and lowering in the operating accuracy of the robot can be prevented.

Moreover, as illustrated in FIG. 4, in the horizontal articulated robot 100 according to Embodiment 1, the first ring member 61 is formed so that the angle θA between the imaginary line Y and the axial center L1A of the base-end part of the first arm 21 when the tip-end part of the first arm 21 is in the first state, and the angle θB between the imaginary line Y and the axial center L1B of the base-end part of the first arm 21 when the tip-end part of the first arm 21 is in the second state, become the first angle θ.

Therefore, in the horizontal articulated robot 100 according to Embodiment 1, the amount of bending of the first arm 21 becomes the same, regardless of the posture of the robot. Therefore, since the amount of deviation from the taught position coordinates becomes the same regardless of the posture of the robot, the burden of the teaching work by the operator can be reduced.

[Operation and Effects of Second Ring Member]

FIGS. 5 and 6 are schematic views illustrating a substantial part of the horizontal articulated robot according to Embodiment 1.

As illustrated in FIGS. 5 and 6, in the horizontal articulated robot 100 according to Embodiment 1, the height dimension of the second ring member 62 is formed so as to be larger at the tip-end-part side of the first arm 21, as compared with the base-end-part side of the first arm 21.

Therefore, the bending of the first arm 21 can be corrected and the deviation from the taught position coordinates can be reduced. Therefore, the lowering in the operating accuracy of the robot can be prevented.

Moreover, in the horizontal articulated robot 100 according to Embodiment 1, the second ring member 62 is formed to have the height dimension so that the axial center of the first arm 21 at the tip-end-part side (rotation axis L3) is oriented in the vertical direction. Therefore, the tip-end part of the first arm 21 can be oriented horizontally. Therefore, when the robot operates, the deviation from the taught position coordinates can be reduced, and the lowering in the operating accuracy of the robot can be prevented.

[Modification 1]

Next, a modification of the horizontal articulated robot according to Embodiment 1 is described with reference to FIGS. 7 and 8.

In the horizontal articulated robot of Modification 1 in Embodiment 1, the ring member has a first ring member disposed between the pedestal and the second connecting part, and a second ring member disposed between the first connecting part and the other arm.

Moreover, in the horizontal articulated robot of Modification 1, the first ring member may be formed to have the height dimension so that an angle between the axial center of one arm at the base-end-part side and the imaginary line extending in the vertical direction becomes the given first angle set in advance.

Below, one example of the horizontal articulated robot of Modification 1 is described with reference to FIGS. 7 and 8.

[Configuration of Horizontal Articulated Robot]

Figure 7:
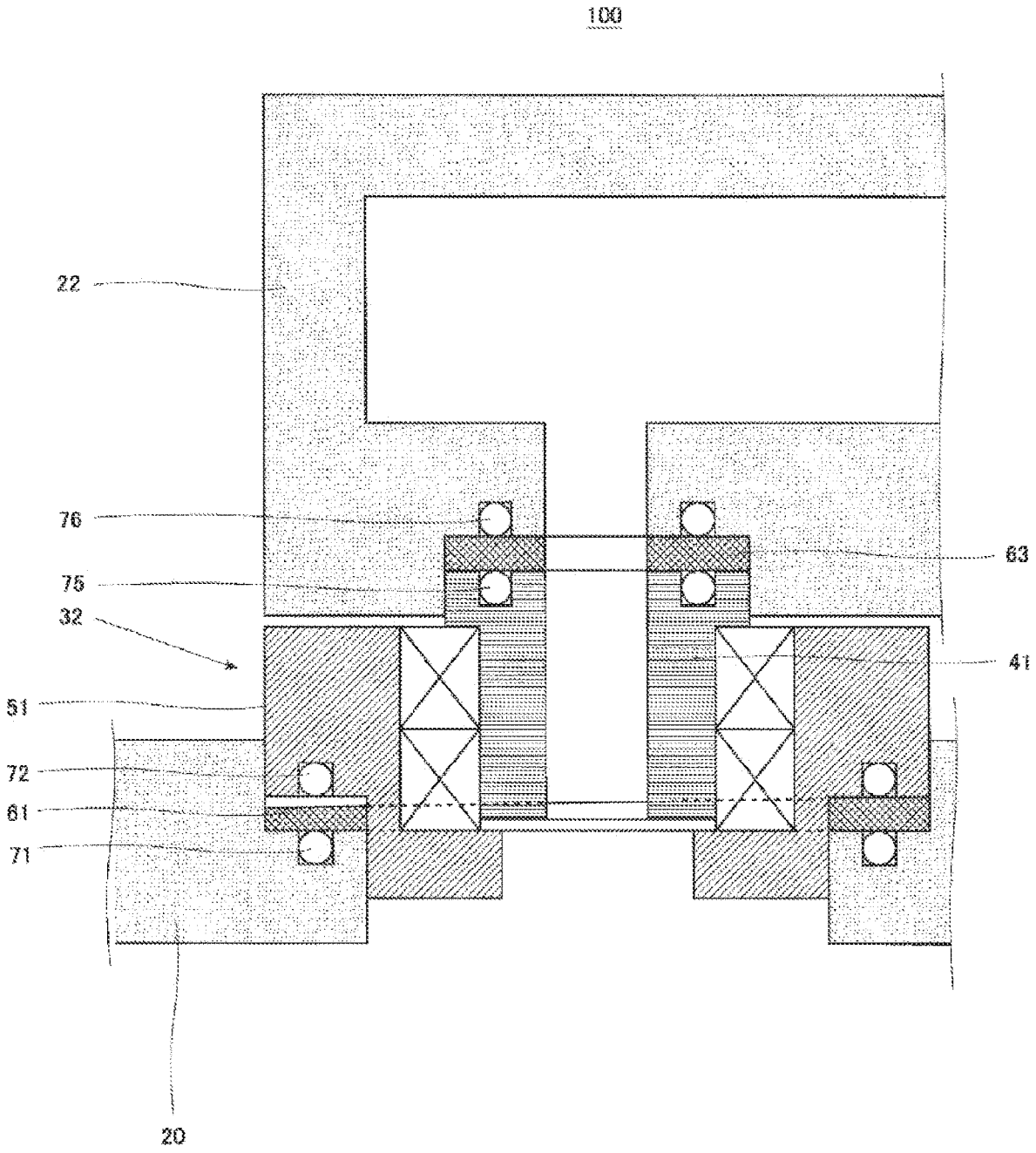
FIG. 7 is a cross-sectional view illustrating an outline configuration near a second connecting part of a horizontal articulated robot of Modification 1 in Embodiment 1.

FIG. 7 is a cross-sectional view illustrating an outline configuration near the second connecting part of the horizontal articulated robot of Modification 1 in Embodiment 1. FIG. 8 is a cross-sectional view illustrating an outline configuration near the first connecting part of the horizontal articulated robot of Modification 1 in Embodiment 1. Note that, in FIGS. 7 and 8, in order to facilitate understandings of the present disclosure, a gap is formed between the ring member and the arm, but if the ring member and the arm are fastened by a suitable component, the gap will not be formed.

Figure 8:
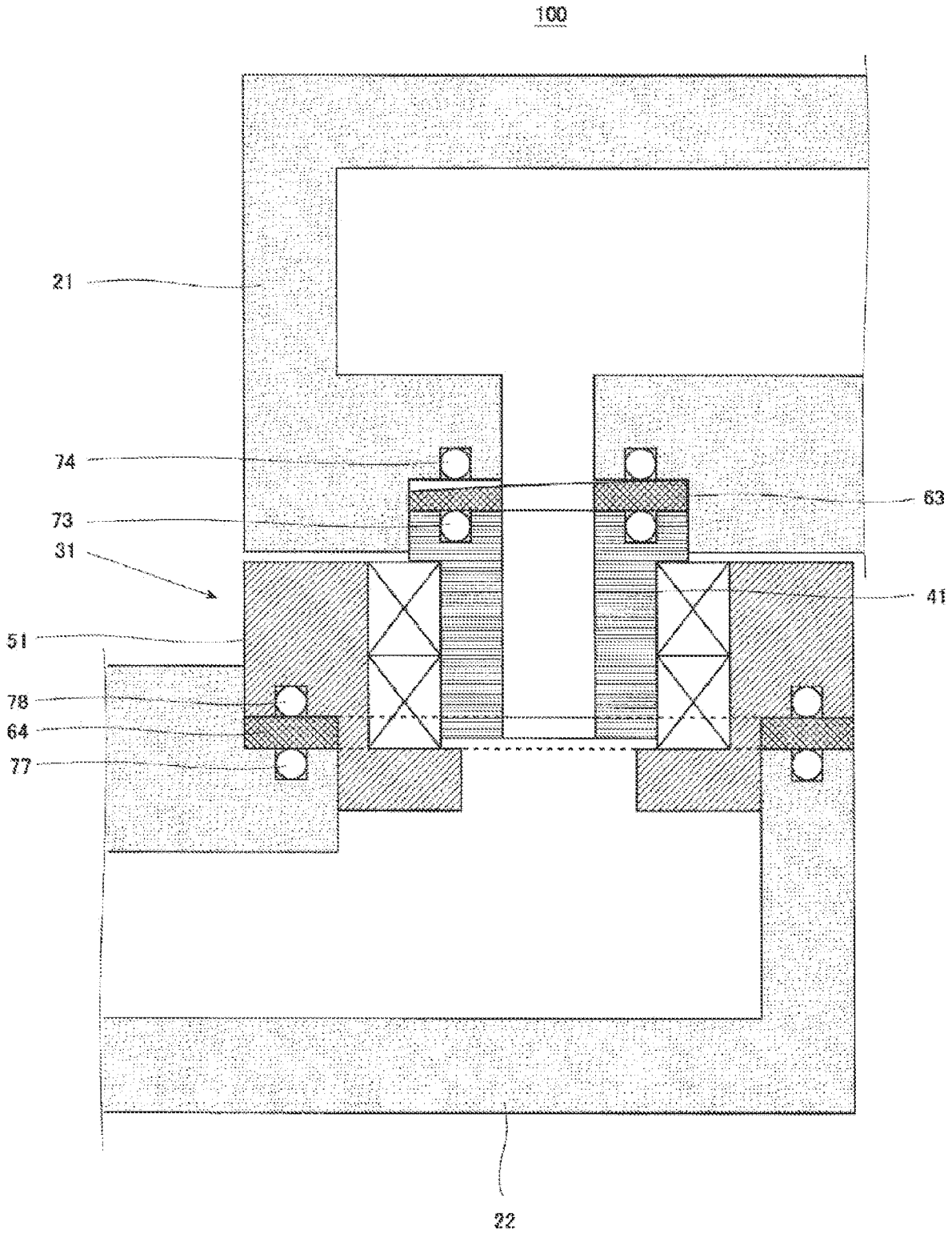
FIG. 8 is a cross-sectional view illustrating an outline configuration near a first connecting part of the horizontal articulated robot of Modification 1 in Embodiment 1.

As illustrated in FIGS. 7 and 8, in the horizontal articulated robot 100 of Modification 1, the first ring member 61 is disposed between the upper end part of the pedestal 20 and the lower end part of the bearing member 51 in the second connecting part 32, and the second ring member 62 is disposed between the upper end part of the shaft member 41 in the first connecting part 31 and the lower end part of the first arm 21.

Moreover, as illustrated in FIG. 7, a third ring member 63 having an annular shape is disposed between the upper end part of the shaft member 41 in the second connecting part 32 and the lower end part of the second arm 22. The third ring member 63 is formed so that the height dimension becomes the same at the tip-end-part side of the second arm 22 and the base-end-part side of the second arm 22.

A sealing member 75 is disposed in the upper end part of the shaft member 41, at a part which contacts the lower end surface of the third ring member 63. Moreover, a sealing member 76 is disposed in the lower end part of the second arm 22, at a part which contacts the upper end surface of the third ring member 63. As the sealing member 75 and the sealing member 76, O-rings may be used, for example.

Moreover, as illustrated in FIG. 8, a fourth ring member 64 having an annular shape is disposed between the upper end part of the second arm 22 and the lower end part of the bearing member 51 in the first connecting part 31. The fourth ring member 64 is formed so that the height dimension becomes the same at the tip-end-part side of the second arm 22 and the base-end-part side of the second arm 22.

A sealing member 77 is disposed in the upper end part of the second arm 22, at a part which contacts the lower end surface of the fourth ring member 64. Moreover, a sealing member 78 is disposed in the lower end part of the bearing member 51, at a part which contacts the upper end surface of the fourth ring member 64. As the sealing member 77 and the sealing member 78, O-rings may be used, for example.

The horizontal articulated robot 100 of Modification 1 configured in this way also demonstrates similar operation and effects to the horizontal articulated robot 100 according to Embodiment 1.

Embodiment 2

A horizontal articulated robot according to Embodiment 2 is suspended from or mounted onto a ceiling, and the ring member is formed so that the height dimension becomes larger at the base-end-part side of the arm, as compared with the tip-end-part side.

Below, one example of the horizontal articulated robot according to Embodiment 2 is described with reference to FIGS. 9 to 14.

[Configuration of Horizontal Articulated Robot]

Figure 9:
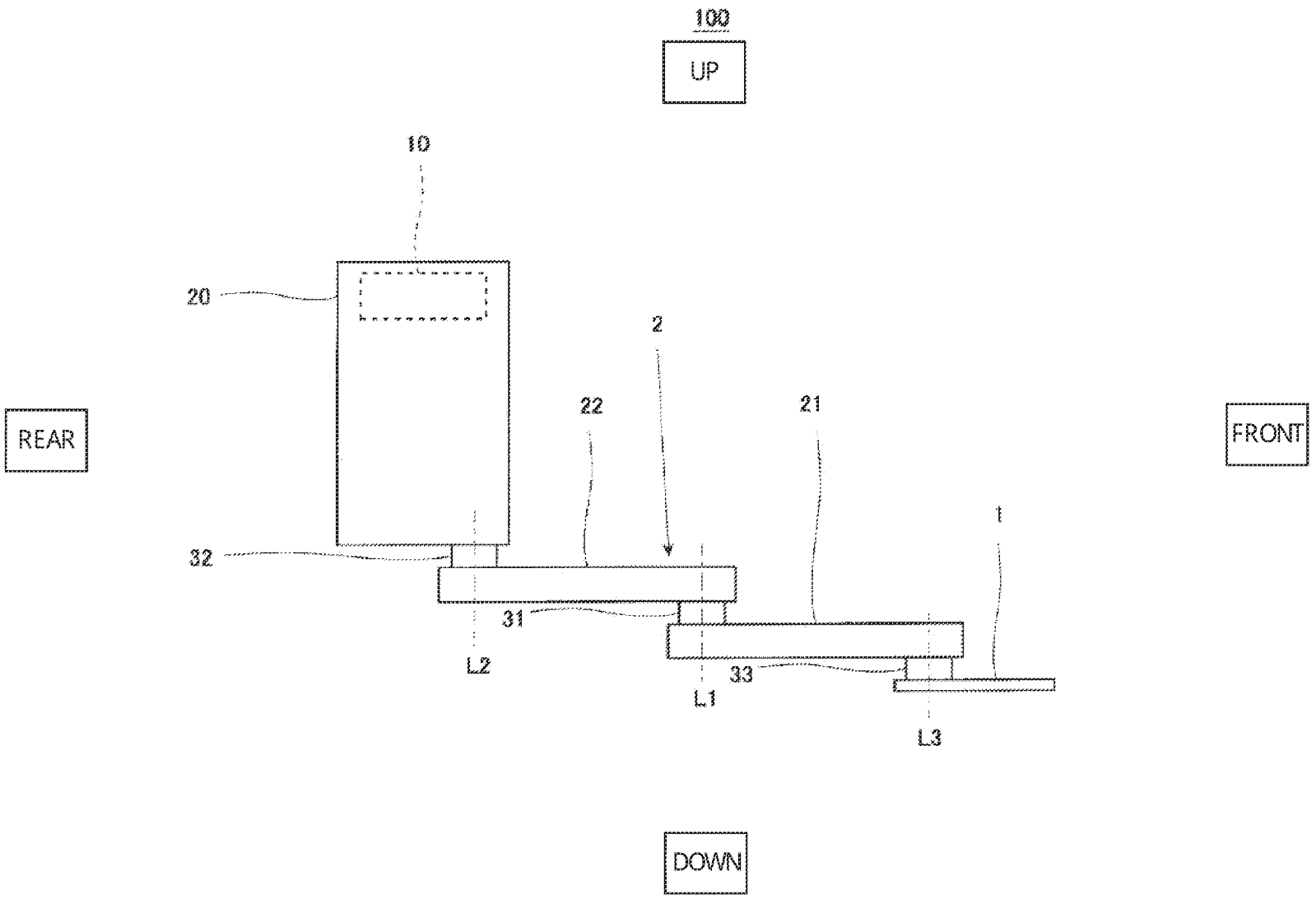
FIG. 9 is a front view schematically illustrating an outline configuration of a horizontal articulated robot according to Embodiment 2.

FIG. 9 is a front view schematically illustrating an outline configuration of the horizontal articulated robot according to Embodiment 2. Note that, in FIG. 9, the up-and-down direction and the front-and-rear direction of the horizontal articulated robot are expressed as the up-and-down direction and the front-and-rear direction illustrated in the drawing.

As illustrated in FIG. 9, the horizontal articulated robot 100 according to Embodiment 2 differs from the horizontal articulated robot 100 according to Embodiment 1 in that it is suspended from the ceiling. Below, the difference between the horizontal articulated robot 100 according to Embodiment 2 and the horizontal articulated robot 100 according to Embodiment 1 is described with reference to FIG. 10.

Figure 10:
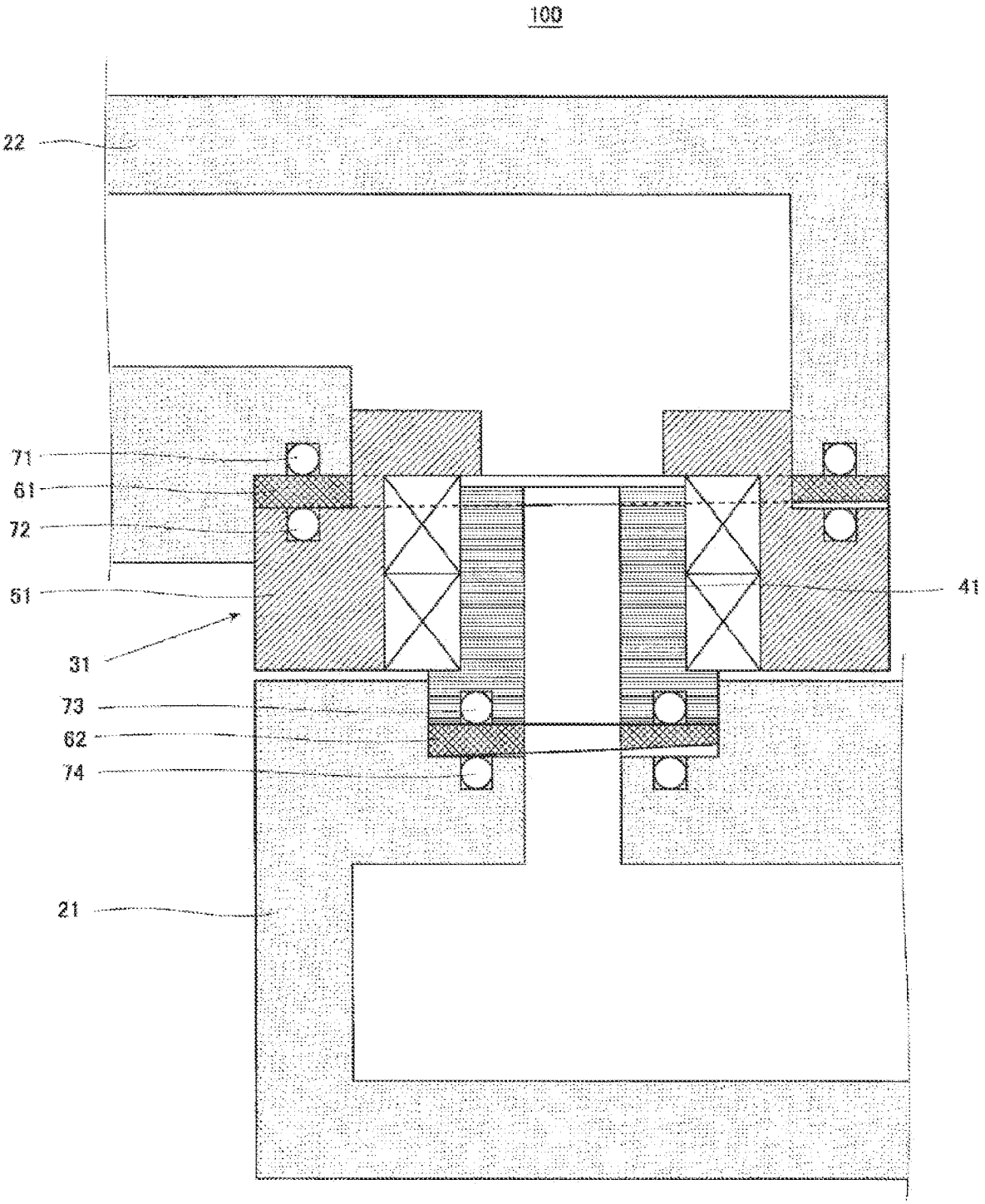
FIG. 10 is a cross-sectional view illustrating an outline configuration of a first connecting part in the horizontal articulated robot illustrated in FIG. 9.

FIG. 10 is a cross-sectional view illustrating an outline configuration of a first connecting part in the horizontal articulated robot illustrated in FIG. 9. Note that, in FIG. 10, in order to facilitate understandings of the present disclosure, a gap is formed between the ring member and the arm, but if the ring member and the arm are fastened by a suitable component, the gap will not be formed.

As illustrated in FIG. 10, in the horizontal articulated robot 100 according to Embodiment 2, the upper end part of the bearing member 51 is fixed to the lower end part of the second arm 22 by a suitable component (e.g., bolts). Moreover, the first ring member 61 is disposed between the upper end part of the bearing member 51 and the lower end part of the second arm 22. The first ring member 61 is fixed to the lower end part of the second arm 22 by a suitable component.

Moreover, in the horizontal articulated robot 100 according to Embodiment 2, the first ring member 61 is formed so that the height dimension becomes larger at the base-end-part side of the second arm 22, as compared with the tip-end-part side of the second arm 22. In detail, for example, in terms of correcting the bending of the second arm 22, the first ring member 61 may be formed so that its height dimension at the base-end-part side of the second arm 22 becomes 0.1 to 1.0 mm larger than its height dimension at the tip-end part side of the second arm 22.

Figure 12:
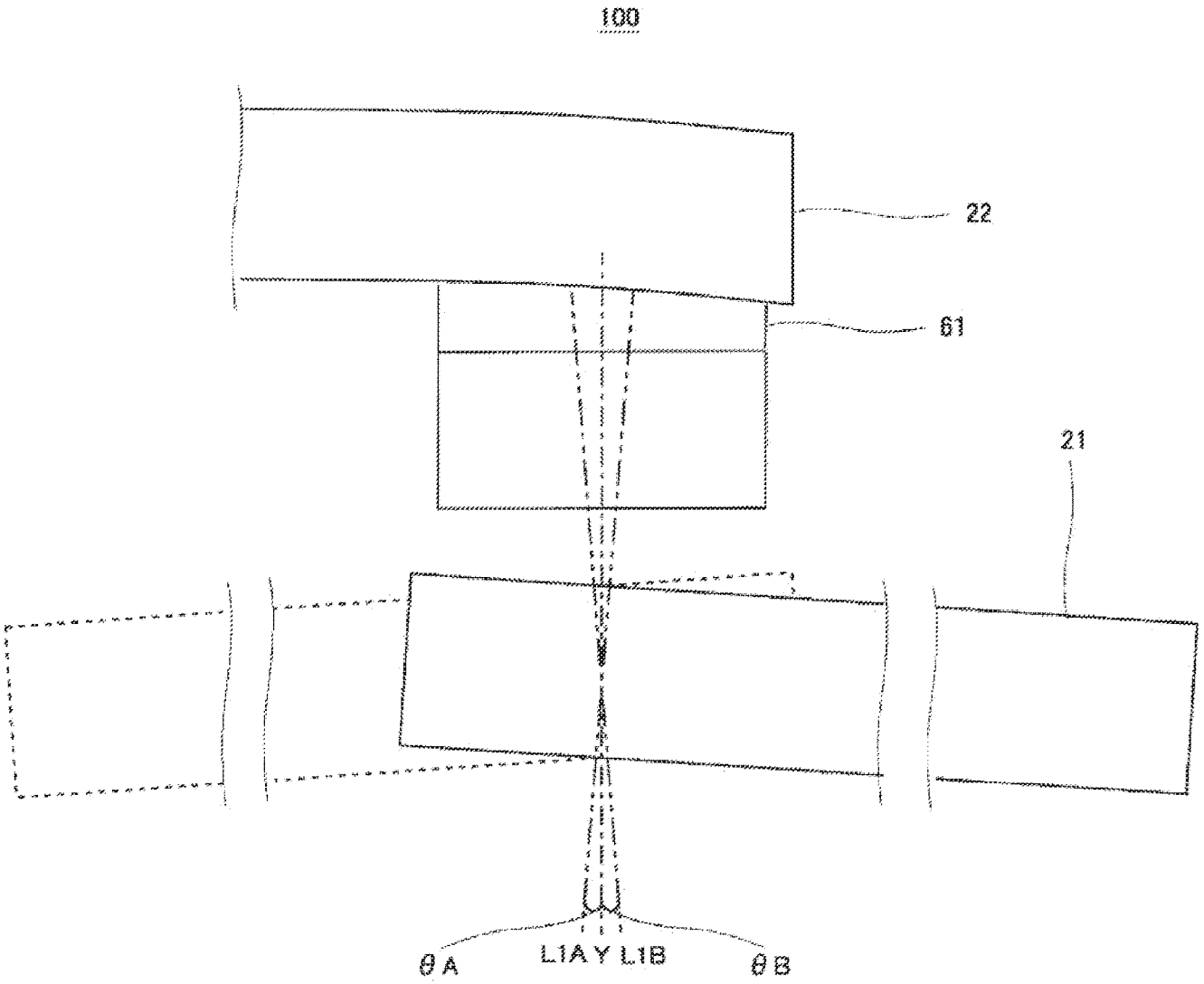
FIG. 12 is a schematic view illustrating a bending state of arms in the horizontal articulated robot according to Embodiment 2.

Moreover, the first ring member 61 may be formed to have the height dimension so that the angle between the axial center of the first arm 21 at the base-end-part side and the imaginary line Y extending in the vertical direction becomes the given first angle set in advance (see FIG. 12). In detail, the first ring member 61 is formed to have the height dimension so that the angle between the axial center of the first arm 21 at the base-end-part side and the imaginary line Y becomes the first angle, regardless of the posture (rotational angle) of the first arm 21.

Moreover, the first ring member 61 may be formed so that the lower end surface is inclined, when seen horizontally. Moreover, the first ring member 61 may be formed so that the upper end surface becomes horizontal, when seen horizontally.

Moreover, in the horizontal articulated robot 100 according to Embodiment 2, the lower end part of the shaft member 41 is fixed to the upper end part of the first arm 21 by a suitable component (e.g., bolts). Moreover, the second ring member 62 is disposed between the lower end part of the shaft member 41 and the upper end part of the first arm 21. The second ring member 62 is fixed to the upper end part of the first arm 21 by a suitable component (e.g., bolts). Therefore, the second ring member 62 is rotatable to the second arm 22 in connection with the rotation of the first arm 21.

The second ring member 62 is formed so that the height dimension becomes larger at the base-end-part side of the first arm 21, as compared with the tip-end-part side of the first arm 21. In detail, for example, in terms of correcting the bending of the first arm 21, the second ring member 62 may be formed so that the height dimension at the base-end-part side of the first arm 21 becomes 0.1 to 1.0 mm larger than the height dimension at the tip-end-part side of the first arm 21.

Figure 13:
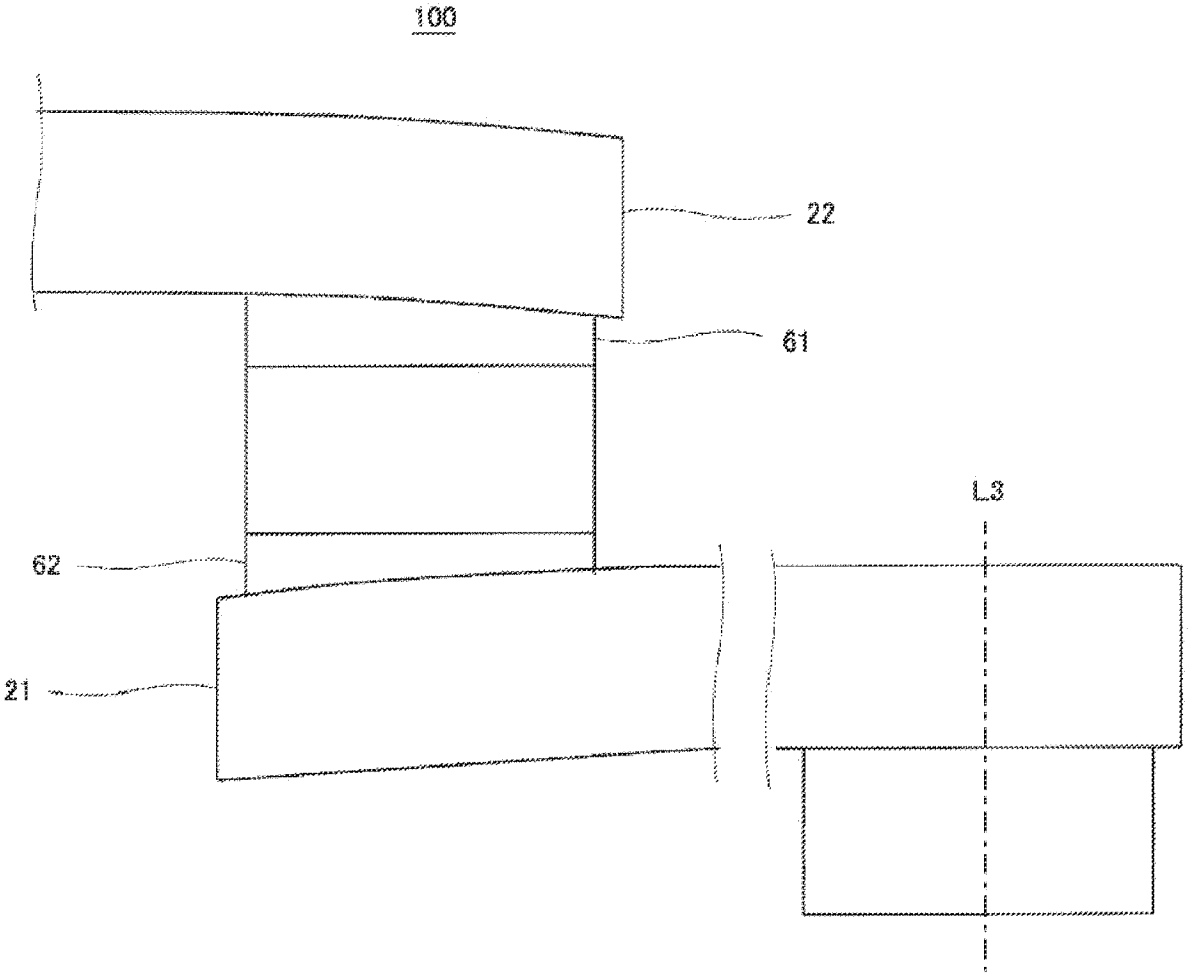
FIG. 13 is a schematic view illustrating a substantial part of the horizontal articulated robot according to Embodiment 2.
Figure 14:
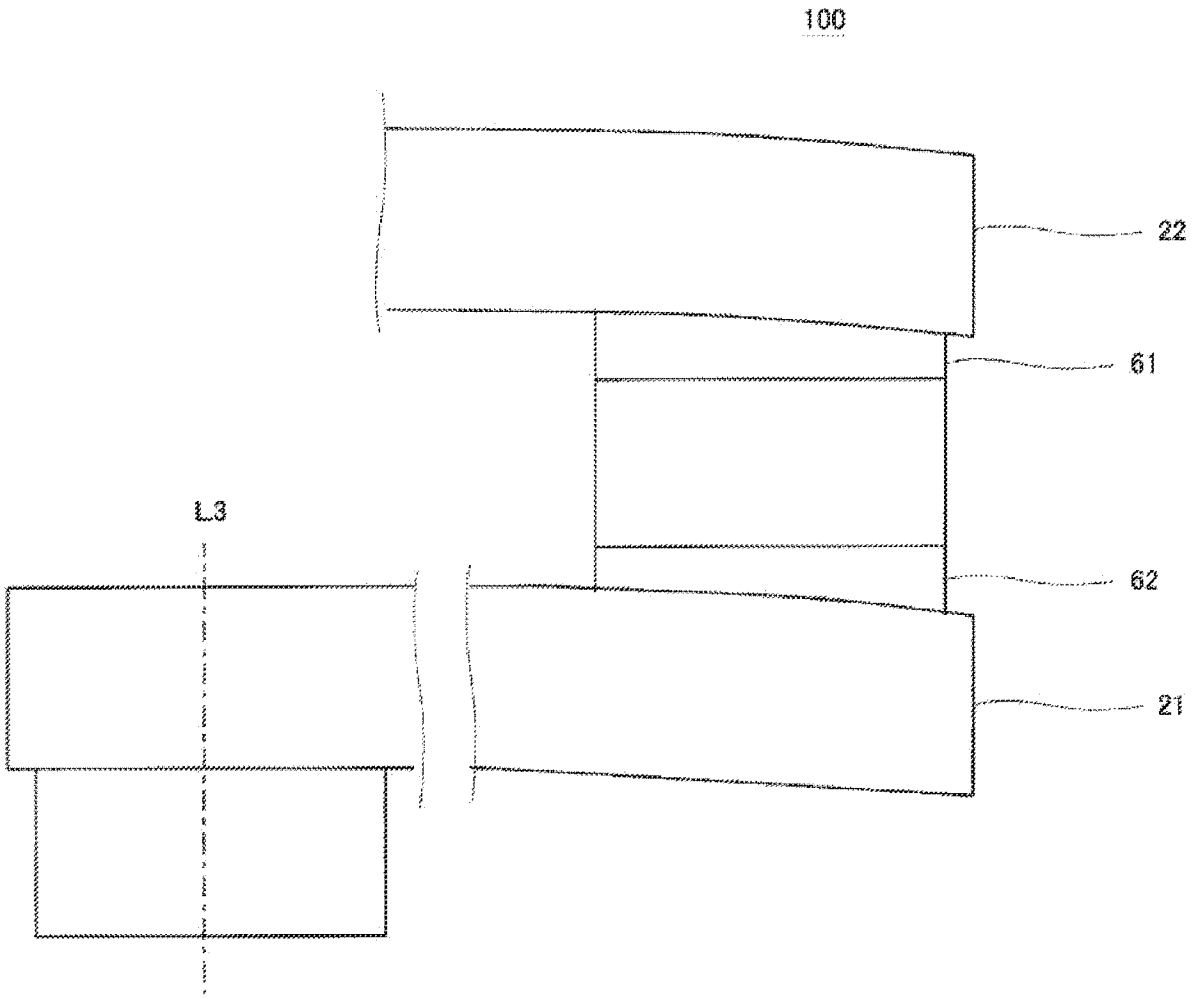
FIG. 14 is a schematic view illustrating the substantial part of the horizontal articulated robot according to Embodiment 2.

Moreover, the second ring member 62 may be formed to have the height dimension so that the axial center of the first arm 21 at the tip-end-part side is oriented in the vertical direction (see FIGS. 13 and 14). In other words, the second ring member 62 may be formed to have the height dimension so that the tip-end part of the first arm 21 becomes horizontal, when seen horizontally.

Moreover, the second ring member 62 may be formed so that the upper end surface becomes horizontal, when seen horizontally. Moreover, the second ring member 62 may be formed so that the lower end surface is inclined, when seen horizontally.

Moreover, in the horizontal articulated robot 100 according to Embodiment 2, the sealing member 71 is disposed in the lower end part of the second arm 22, at a part which contacts the lower end surface of the first ring member 61. The sealing member 72 is disposed in the upper end part of the bearing member 51, at a part which contacts the upper end surface of the first ring member 61.

Similarly, the sealing member 73 is disposed in the lower end part of the shaft member 41, at a part which contacts the lower end surface of the second ring member 62. Moreover, the sealing member 74 is disposed in the upper end part of the first arm 21, at a part which contacts the upper end surface of the second ring member 62.

Note that, although in the horizontal articulated robot 100 according to Embodiment 2 the first ring member 61 and the second ring member 62 are disposed in the first connecting part 31, it is not limited to this configuration. Like the horizontal articulated robot 100 of Modification 1 in Embodiment 1, the first ring member 61 may be disposed in the second connecting part 32, and the second ring member 62 may be disposed in the first connecting part 31.

[Operation and Effects of Horizontal Articulated Robot]

Next, operation and effects of the horizontal articulated robot 100 according to Embodiment 2 is described with reference to FIGS. 9 to 14.

[Operation and Effects of First Ring Member]

Figure 11:
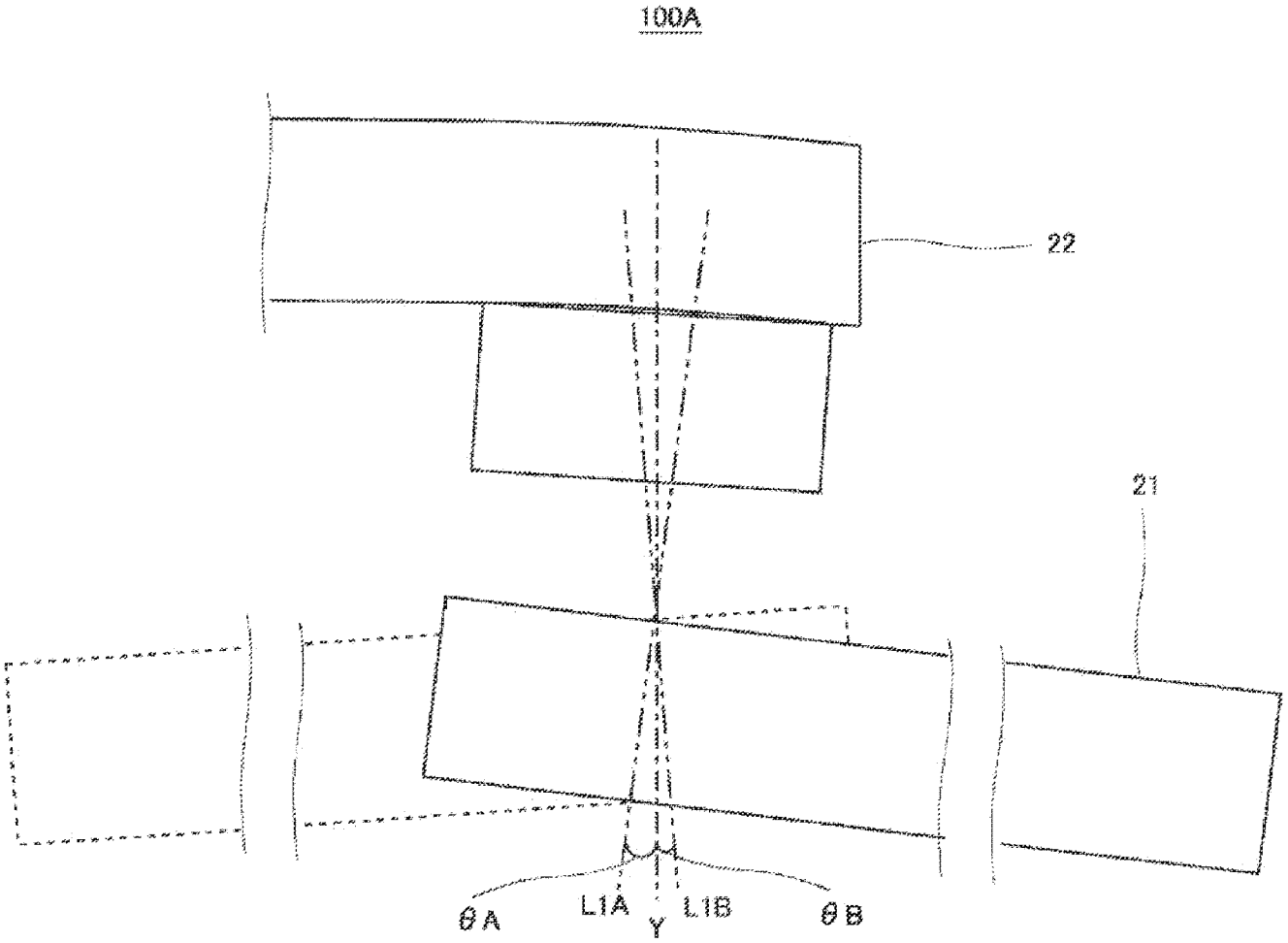
FIG. 11 is a schematic view illustrating a bending state of the arms in the conventional horizontal articulated robot.

FIG. 11 is a schematic view illustrating a bending state of the arms in the conventional horizontal articulated robot. FIG. 12 is a schematic view illustrating a bending state of the arms in the horizontal articulated robot according to Embodiment 2.

As illustrated in FIG. 11, in the conventional horizontal articulated robot 100A, when the tip-end part of the first arm 21 is in the first state, the amount of bending of the first arm 21 is added to the amount of bending of the second arm 22. Therefore, the total amount of bending of the horizontal articulated robot 100A becomes larger when the tip-end part of the first arm 21 is in the first state, as compared with when the tip-end part of the first arm 21 is in the second state.

In other words, the angle θA between the imaginary line Y and the axial center L1A of the base-end part of the first arm 21 when the tip-end part of the first arm 21 is in the first state differs from the angle θB between the imaginary line Y and the axial center L1B of the base-end part of the first arm 21 when the tip-end part of the first arm 21 is in the second state.

That is, in the conventional horizontal articulated robot 100A, the amount of bending varies according to the posture of the robot. Therefore, since the amount of deviation of the taught position coordinates differs depending on the posture of the robot, the teaching work by the operator may become complicated.

On the other hand, as illustrated in FIG. 12, in the horizontal articulated robot 100 according to Embodiment 2, the first ring member 61 is formed so that the height dimension becomes larger at the base-end-part side of the second arm 22, as compared with the tip-end-part side of the second arm 22.

Therefore, the bending of the second arm 22 can be corrected, and the effect to the first arm 21 due to the bending of the second arm 22 can be reduced.

Moreover, the amount of bending of the first arm 21 can be reduced when the tip-end part of the first arm 21 is in the first state, as compared with the conventional horizontal articulated robot 100A. Therefore, when the robot operates, the deviation from the taught position coordinates can be reduced, and the lowering in the operating accuracy of the robot can be prevented.

Moreover, as illustrated in FIG. 12, in the horizontal articulated robot 100 according to Embodiment 2, the first ring member 61 is formed so that the angle θA between the imaginary line Y and the axial center L1A of the base-end part of the first arm 21 when the tip-end part of the first arm 21 is in the first state, and the angle θB between the imaginary line Y and the axial center L1B of the base-end part of the first arm 21 when the tip-end part of the first arm 21 is in the second state, become the first angle θ.

Therefore, in the horizontal articulated robot 100 according to Embodiment 2, the amount of bending of the first arm 21 becomes the same, regardless of the posture of the robot. Therefore, since the amount of deviation from the taught position coordinates becomes the same regardless of the posture of the robot, the burden of the teaching work by the operator can be reduced.

[Operation and Effects of Second Ring Member]

FIGS. 13 and 14 are schematic views illustrating a substantial part of the horizontal articulated robot according to Embodiment 2.

As illustrated in FIGS. 13 and 14, in the horizontal articulated robot 100 according to Embodiment 2, the second ring member 62 is formed so that the height dimension becomes larger at the base-end-part side of the first arm 21, as compared with the tip-end-part side of the first arm 21.

Therefore, the bending of the first arm 21 can be corrected and the deviation from the taught position coordinates can be reduced. Therefore, the lowering in the operating accuracy of the robot can be prevented.

Moreover, in the horizontal articulated robot 100 according to Embodiment 2, the second ring member 62 is formed to have the height dimension so that the axial center of the first arm 21 at the tip-end-part side (rotation axis L3) is oriented in the vertical direction. Therefore, the tip-end part of the first arm 21 can be oriented horizontally. Therefore, when the robot operates, the deviation from the taught position coordinates can be reduced, and the lowering in the operating accuracy of the robot can be prevented.

Embodiment 3

A horizontal articulated robot according to Embodiment 3 is a horizontal articulated robot having a pedestal and a plurality of arms. The horizontal articulated robot includes a first connecting part disposed between two arms and connecting the other arm rotatably to one arm, and a second connecting part disposed between the pedestal and the arm and connecting the arm rotatably to the pedestal. In each of the first connecting part and the second connecting part, the shaft member and the bearing member are disposed, and at least one of a first contact surface which is a contact surface of the arm with shaft member, a second contact surface which is a contact surface of the arm with the bearing member, and a third contact surface which is a contact surface of the pedestal with the bearing member is formed so that it is inclined when seen horizontally.

Alternatively, in the horizontal articulated robot according to Embodiment 3, the robot may be installed on a floor surface, and at least one of the first contact surface and the third contact surface may be formed so that it is located higher at the tip-end-part side in the extending direction of the arms when seen horizontally, as compared with the base-end-part side in the extending direction of the arms.

Alternatively, in the horizontal articulated robot according to Embodiment 3, the second contact surface may be formed so that it is located lower at the tip-end-part side of the arm when seen horizontally, as compared with the base-end-part side of the arm.

Alternatively, in the horizontal articulated robot according to Embodiment 3, the first contact surface may be formed so that the angle between the axial center of the other arm at the base-end-part side and the imaginary line extending in the vertical direction becomes the given first angle set in advance.

Alternatively, in the horizontal articulated robot according to Embodiment 3, the second contact surface may be formed so that the axial center of the other arm at the tip-end-part side is oriented in the vertical direction.

Alternatively, in the horizontal articulated robot according to Embodiment 3, a sealing member which seals the interior space of the connecting part may be disposed in at least one of the first connecting part and the second connecting part.

Alternatively, in the horizontal articulated robot according to Embodiment 3, the horizontal articulated robot may be disposed inside a vacuum chamber.

Below, one example of the horizontal articulated robot according to Embodiment 3 is described with reference to FIGS. 15 to 20.

[Configuration of Horizontal Articulated Robot]

Figure 15:
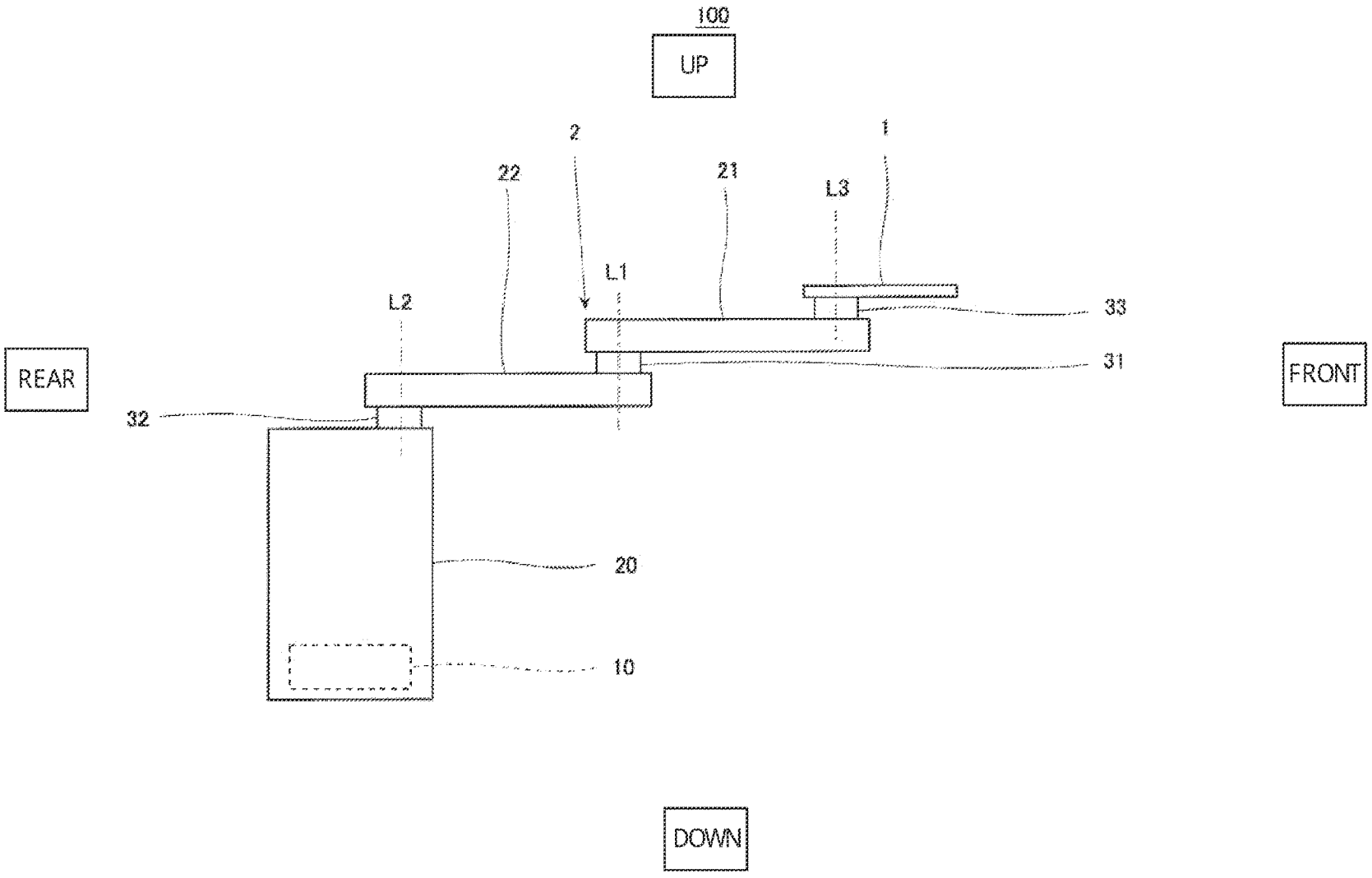
FIG. 15 is a front view schematically illustrating an outline configuration of a horizontal articulated robot according to Embodiment 3.

FIG. 15 is a front view schematically illustrating an outline configuration of the horizontal articulated robot according to Embodiment 3. Note that, in FIG. 15, the up-and-down direction and the front-and-rear direction of the horizontal articulated robot are expressed as the up-and-down direction and the front-and-rear direction illustrated in the drawing.

As illustrated in FIG. 15, the horizontal articulated robot 100 according to Embodiment 3 includes the hand 1, the manipulator 2, and the control device 10, and is configured to hold and convey the workpiece by the hand 1. The workpiece may be, for example, a semiconductor wafer. Note that the configuration of the hand 1 may be any kind of form, as long as it is capable of holding and conveying the workpiece.

Moreover, the horizontal articulated robot 100 according to Embodiment 3 is installed on the floor surface.

The manipulator 2 includes the pedestal 20, the plurality of arms (here, the first arm (the other arm) 21 and the second arm (one arm) 22), the first connecting part 31, the second connecting part 32, and the third connecting part 33. The control device 10 is disposed inside the pedestal 20. Note that the control device 10 may be disposed outside the pedestal 20.

Moreover, the pedestal 20 is also provided with the second connecting part 32. The second connecting part 32 has, for example, a ball screw mechanism, a drive motor, a rotation sensor which detects a rotational position of the drive motor, and a current sensor which detects current for controlling rotation of the drive motor (none of them is illustrated), and the second connecting part 32 expands and contracts in the up-and-down direction, and rotates the second arm 22. Note that the drive motor may be, for example, a servomotor which is servo-controlled by the control device 10. Moreover, the rotation sensor may be, for example, an encoder.

The base-end part of the second arm 22 is connected to the second connecting part 32 so as to be rotatable on the rotation axis L2 which passes through the axial center of the second connecting part 32. The base-end part of the first arm 21 is connected, through the first connecting part 31, to the tip-end part of the second arm 22 so as to be rotatable on the rotation axis L1. Note that a configuration of the first connecting part 31 will be described later.

Moreover, the hand 1 is connected, through the third connecting part 33, to the tip-end part of the first arm 21 so as to be rotatable on the rotation axis L3. The third connecting part 33 has, for example, a drive motor, a rotation sensor which detects a rotational position of the drive motor, and a current sensor which detects current for controlling rotation of the drive motor (none of them is illustrated), and rotates (pivots) the hand 1.

The control device 10 includes a processor, such as a microprocessor and a CPU, and a memory, such as a ROM and a RAM (not illustrated). The memory stores information on a basic program, various fixed data, etc. The processor controls various operations of the horizontal articulated robot 100 by reading and executing software, such as the basic program stored in the memory.

Note that the control device 10 may be comprised of a sole control device 10 which carries out a centralized control, or may be comprised of a plurality of control devices 10 which collaboratively carry out a distributed control. Moreover, the control device 10 may be comprised of a microcomputer, or may be comprised of a MPU, a PLC (Programmable Logic Controller), a logic circuit, etc.

[Configuration of First Connecting Part]

Next, a configuration of the first connecting part 31 in the horizontal articulated robot 100 according to Embodiment 3 is described in detail with reference to FIG. 16.

Figure 16:
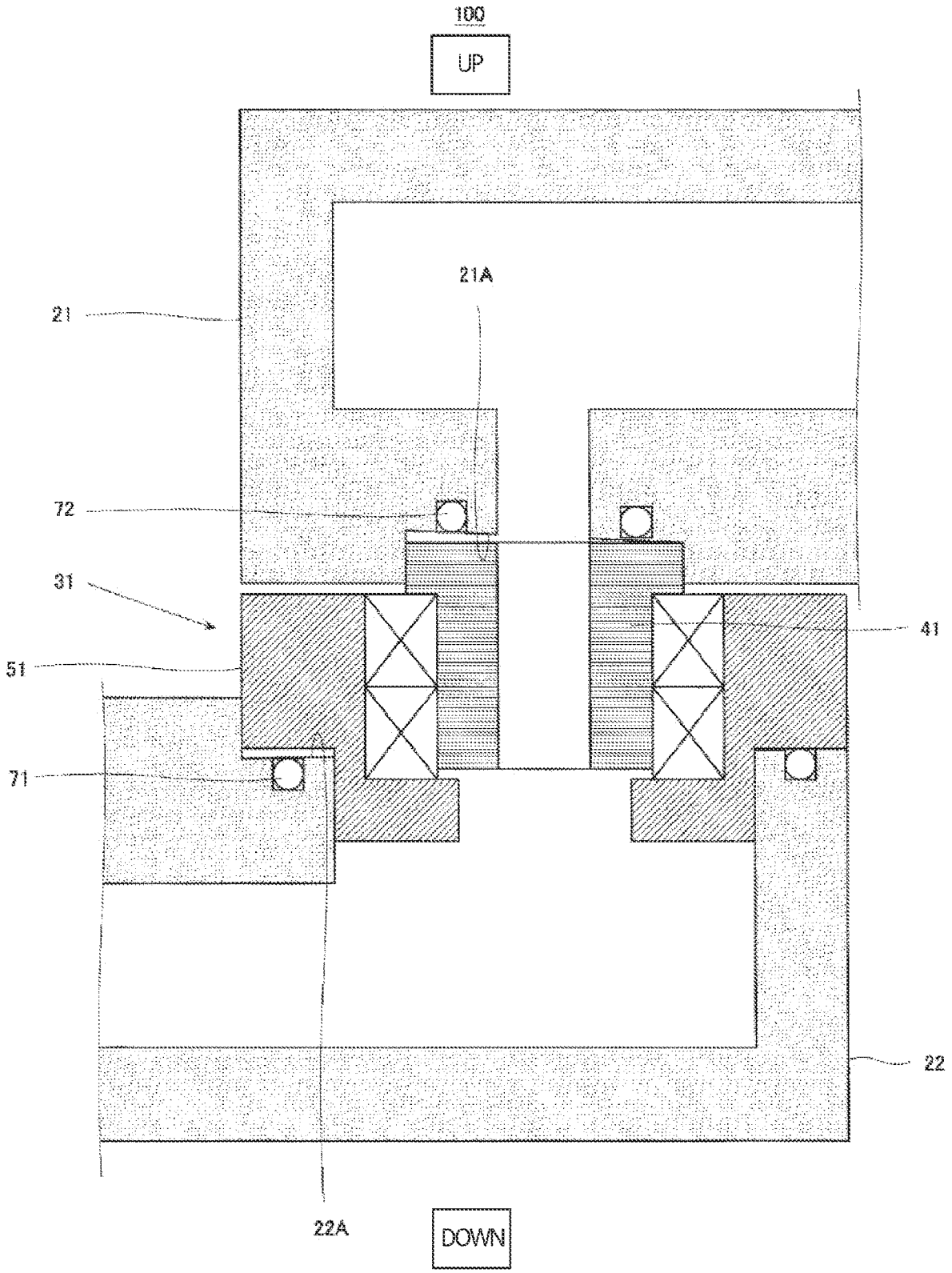
FIG. 16 is a cross-sectional view illustrating an outline configuration of a first connecting part in the horizontal articulated robot according to Embodiment 3.

FIG. 16 is a cross-sectional view illustrating an outline configuration of the first connecting part in the horizontal articulated robot according to Embodiment 3. Note that, in FIG. 16, the up-and-down direction in the horizontal articulated robot is expressed as the up-and-down direction in the drawing. Moreover, in FIG. 16, in order to facilitate understandings of the present disclosure, a gap is formed between the shaft member or the bearing member and the arm, but if the shaft member or the bearing member and the arm are fastened by a suitable component, the gap will not be formed.

As illustrated in FIG. 16, the first connecting part 31 has the shaft member 41 and the bearing member 51. The bearing member 51 is placed on the upper end part of the second arm 22, and is fixed to the second arm 22 by a suitable component (e.g., bolts). Note that, in the following, a part of the upper end part of the second arm 22 where the bearing member 51 is placed is referred to as a "second contact surface 22A."

The second contact surface 22A is formed so that it is inclined, when seen horizontally. In more detail, the second contact surface 22A is formed so that it is located higher at the tip-end-part side than the base-end-part side of the second arm 22. In detail, for example, in terms of correcting the bending of the second arm 22, the second contact surface 22A may be formed so that an end part of the second arm 22 at the tip-end part side may be located 0.1 to 1.0 mm higher than an end part at the base-end-part side.

Figure 18:
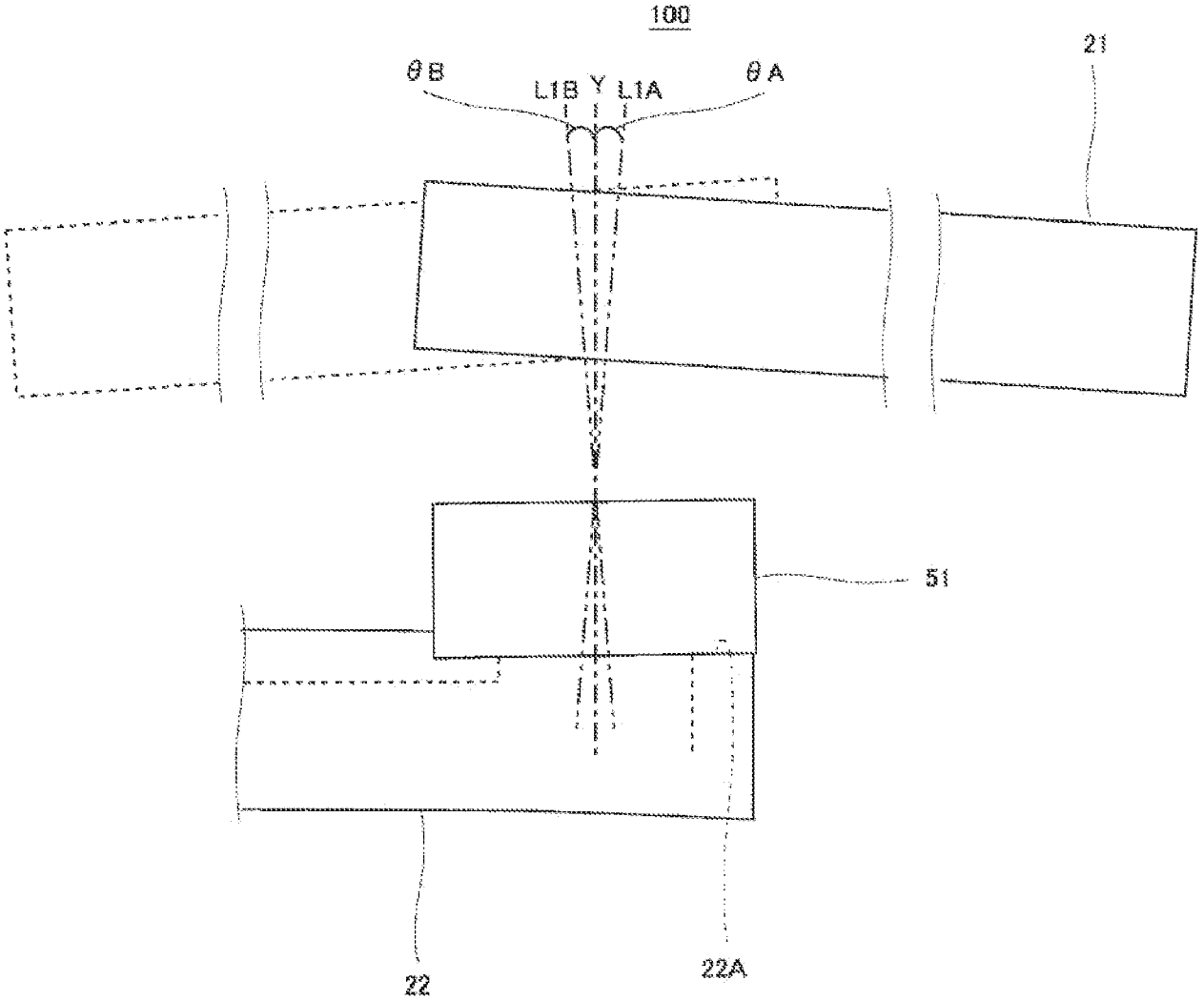
FIG. 18 is a schematic view illustrating a bending state of arms in the horizontal articulated robot according to Embodiment 3.

Moreover, the second contact surface 22A of the second arm 22 may be formed so that the angle between the axial center of the first arm 21 at the base-end-part side and the imaginary line Y extending in the vertical direction becomes the given first angle set in advance (see FIG. 18).

In more detail, the second contact surface 22A is formed so that the angle between the axial center of the first arm 21 at the base-end-part side and the imaginary line Y becomes the first angle, regardless of the posture (rotational angle) of the first arm 21. Here, the first angle θ can be calculated in advance by an experiment etc., and, for example, it may be 0.05° to 0.3°.

The shaft member 41 is fixed at the upper end part to the lower end part of the first arm 21 by a suitable component (e.g., bolts). Note that, in the following, a part of the lower end part of the first arm 21 which contacts the upper end surface of the shaft member 41 is referred to as a "first contact surface 21A."

The first contact surface 21A is formed so that it is inclined, when seen horizontally. In more detail, the first contact surface 21A is formed so that the tip-end-part side of the first arm 21 is located lower, as compared with the base-end-part side of the first arm 21. In detail, for example, in terms of correcting the bending of the first arm 21, the first contact surface 21A may be formed so that the end part of the first arm 21 at the tip-end-part side is located 0.1 to 1.0 mm lower than the end part at the base-end-part side.

Figure 19:
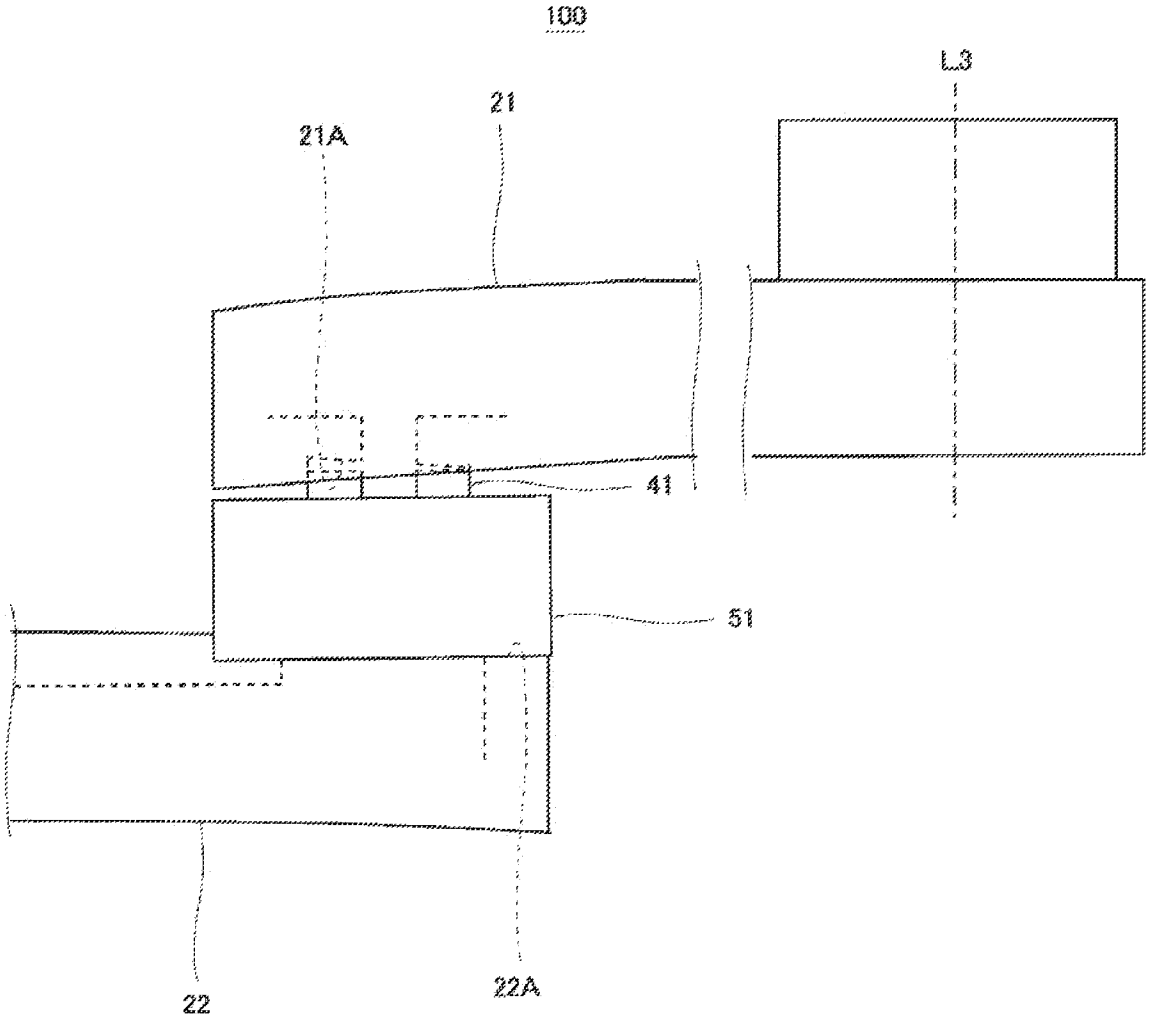
FIG. 19 is a schematic view illustrating a substantial part of the horizontal articulated robot according to Embodiment 3.
Figure 20:
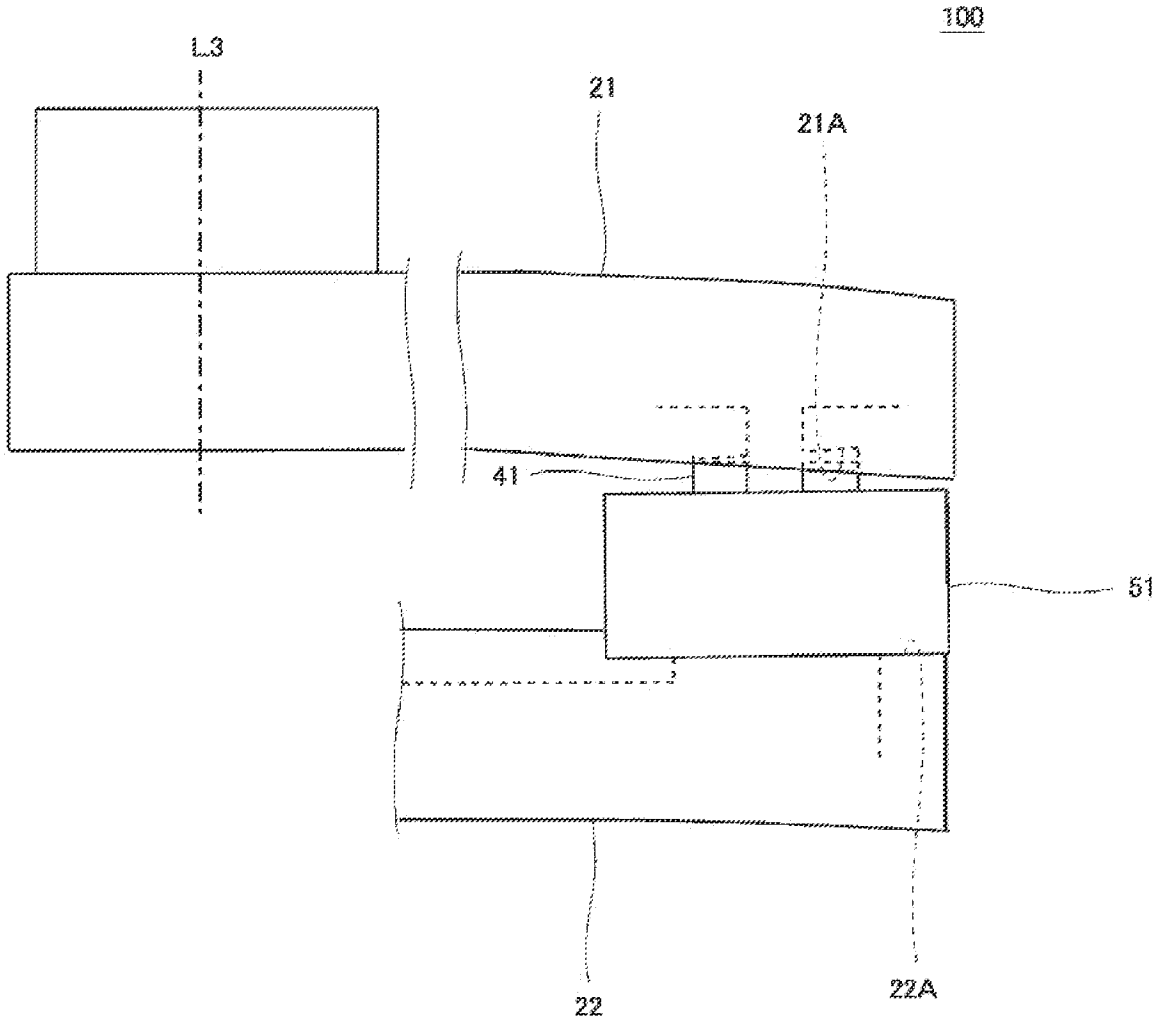
FIG. 20 is a schematic view illustrating the substantial part of the horizontal articulated robot according to Embodiment 3.

Moreover, the first contact surface 21A of the first arm 21 may be formed so that the axial center of the first arm 21 at the tip-end-part side is oriented in the vertical direction, by being inclined (see FIGS. 19 and 20). In more detail, the first contact surface 21A is formed to have the inclination angle so that the axial center of the first arm 21 at the tip-end-part side is oriented in the vertical direction. In other words, the first contact surface 21A may be formed so that the tip-end part of the first arm 21 becomes horizontal, when seen horizontally.

Moreover, the sealing member 71 is disposed on the second contact surface 22A of the second arm 22. Similarly, the sealing member 72 is disposed on the first contact surface 21A of the first arm 21. As the sealing member 71 and the sealing member 72, O-rings may be used, for example.

The sealing member 71 and the sealing member 72 can maintain an interior space of the first connecting part 31 in a sealed state. Therefore, for example, when the horizontal articulated robot 100 is disposed inside the vacuum chamber, the airtightness of the vacuum chamber can be maintained.

Note that, although the configuration of the second connecting part 32 will be described in detail in the description for the horizontal articulated robot 100 of Modification 1 (described later), it is fundamentally configured similarly to the first connecting part 31. In the second connecting part 32, the third contact surface which is the contact surface of the pedestal 20 with the bearing member 51, and the second contact surface which is the contact surface of the second arm 22 with the shaft member 41 are formed so that they become horizontal, when seen horizontally.

[Operation and Effects of Horizontal Articulated Robot]

Next, operation and effects of the horizontal articulated robot 100 according to Embodiment 3 is described with reference to FIGS. 15 to 20.

Figure 17:
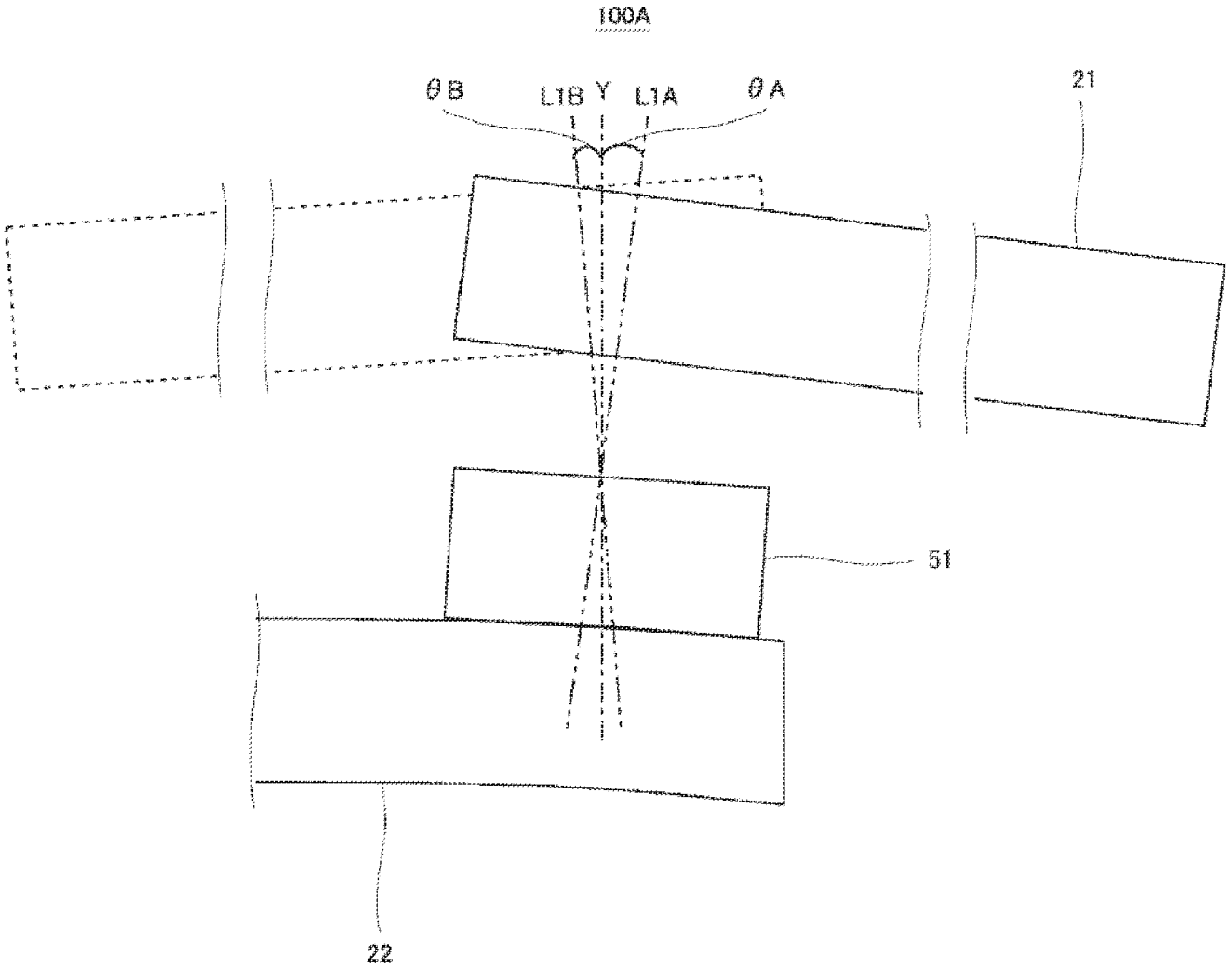
FIG. 17 is a schematic view illustrating a bending state of the arms in the conventional horizontal articulated robot.

FIG. 17 is a schematic view illustrating a bending state of the arms in the conventional horizontal articulated robot. FIG. 18 is a schematic view illustrating a bending state of the arms in the horizontal articulated robot according to Embodiment 3.

First, in FIGS. 17 and 18, a state where the tip-end part of the first arm 21 is distant from the tip-end part of the second arm 22 is defined as a "first state." Moreover, when the first arm 21 is in the first state, the angle between the imaginary line Y extending in the vertical direction and the axial center L1A of the base-end part of the first arm 21 is defined as θA.

Similarly, a state where the tip-end part of the first arm 21 is close to the base-end part of the second arm 22 is defined as a "second state." Moreover, when the first arm 21 is in the second state, the angle between the imaginary line Y and the axial center L1B of the base-end part of the first arm 21 is defined as OB.

As illustrated in FIG. 17, in the conventional horizontal articulated robot 100A, when the tip-end part of the first arm 21 is in the first state, the amount of bending of the first arm 21 is added to the amount of bending of the second arm 22. Therefore, the total amount of bending of the horizontal articulated robot 100A becomes larger when the tip-end part of the first arm 21 is in the first state, as compared with when the tip-end part of the first arm 21 is in the second state.

In other words, the angle θA between the imaginary line Y and the axial center L1A of the base-end part of the first arm 21 when the tip-end part of the first arm 21 is in the first state differs from the angle θB between the imaginary line Y and the axial center L1B of the base-end part of the first arm 21 when the tip-end part of the first arm 21 is in the second state.

That is, in the conventional horizontal articulated robot 100A, the amount of bending varies according to the posture of the robot. Therefore, since the amount of deviation of the taught position coordinates differs depending on the posture of the robot, the teaching work by the operator may become complicated.

On the other hand, as illustrated in FIG. 18, in the horizontal articulated robot 100 according to Embodiment 3, the second contact surface 22A of the second arm 22 is formed so that it is located higher at the tip-end-part side than the base-end-part side of the second arm 22.

Therefore, the bending of the second arm 22 can be corrected, and the effect to the first arm 21 due to the bending of the second arm 22 can be reduced.

Moreover, the amount of bending of the first arm 21 can be reduced when the tip-end part of the first arm 21 is in the first state, as compared with the conventional horizontal articulated robot 100A. Therefore, when the robot operates, the deviation from the taught position coordinates can be reduced, and the lowering in the operating accuracy of the robot can be prevented.

Moreover, as illustrated in FIG. 18, in the horizontal articulated robot 100 according to Embodiment 3, the second contact surface 22A of the second arm 22 is formed so that the angle θA between the imaginary line Y and the axial center L1A of the base-end part of the first arm 21 when the tip-end part of the first arm 21 is in the first state, and the angle θB between the imaginary line Y and the axial center L1B of the base-end part of the first arm 21 when the tip-end part of the first arm 21 is in the second state become the first angle θ.

Therefore, in the horizontal articulated robot 100 according to Embodiment 3, the amount of bending of the first arm 21 becomes the same, regardless of the posture of the robot. Therefore, since the amount of deviation from the taught position coordinates becomes the same regardless of the posture of the robot, the burden of the teaching work by the operator can be reduced.

FIGS. 19 and 20 are schematic views illustrating a substantial part of the horizontal articulated robot according to Embodiment 3.

As illustrated in FIGS. 19 and 20, in the horizontal articulated robot 100 according to Embodiment 3, the first contact surface 21A of the first arm 21 is formed so that the tip-end-part side of the first arm 21 is located lower, as compared with the base-end-part side of the first arm 21.

Therefore, the bending of the first arm 21 can be corrected and the deviation from the taught position coordinates can be reduced. Therefore, the lowering in the operating accuracy of the robot can be prevented.

Moreover, in the horizontal articulated robot 100 according to Embodiment 3, by the first contact surface 21A being inclined, the axial center of the first arm 21 at the tip-end-part side (rotation axis L3) is oriented in the vertical direction. Therefore, the tip-end part of the first arm 21 can be oriented horizontally. Therefore, when the robot operates, the deviation from the taught position coordinates can be reduced, and the lowering in the operating accuracy of the robot can be prevented.

[Modification 1]

Next, a modification of the horizontal articulated robot according to Embodiment 3 is described with reference to FIGS. 21 to 23.

In the horizontal articulated robot of Modification 1 in Embodiment 3, the horizontal articulated robot is installed on the floor surface, and the third contact surface is formed so that it is located higher at the tip-end-part side in the extending direction of the arms when seen horizontally, as compared with the base-end-part side in the extending direction of the arms.

Alternatively, in the horizontal articulated robot of Modification 1, the third contact surface may be formed so that the angle between the axial center of the arm at the base-end-part side and the imaginary line extending in the vertical direction becomes the given first angle set in advance.

Below, one example of the horizontal articulated robot of Modification 1 is described with reference to FIGS. 21 to 23.

[Configuration of Horizontal Articulated Robot]

Figure 21:
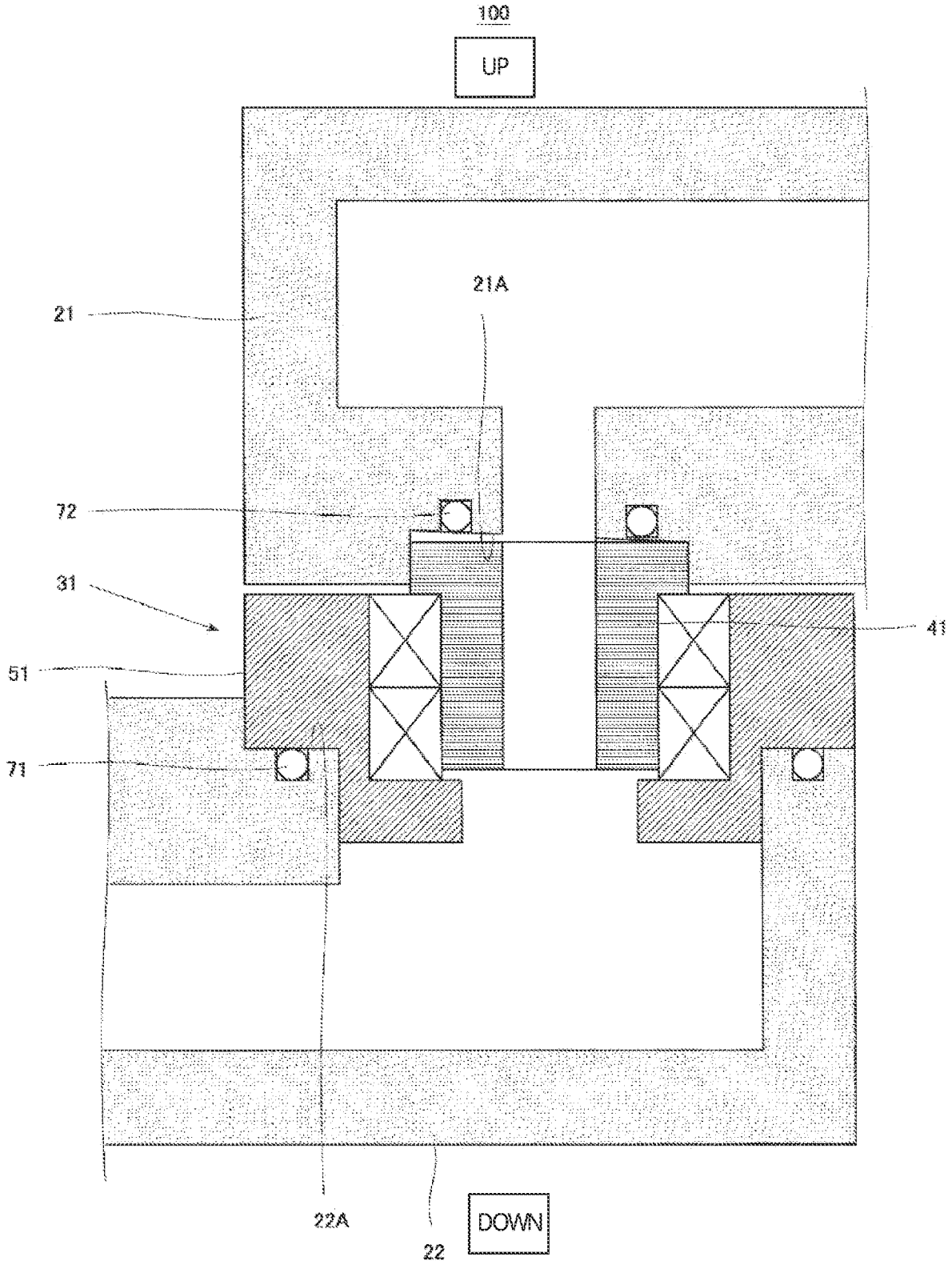
FIG. 21 is a cross-sectional view illustrating an outline configuration near a first connecting part of a horizontal articulated robot of Modification 1 in Embodiment 3.

FIG. 21 is a cross-sectional view illustrating an outline configuration near the first connecting part of the horizontal articulated robot of Modification 1 in Embodiment 3. FIG. 22 is a cross-sectional view illustrating an outline configuration near the second connecting part of the horizontal articulated robot of Modification 1 in Embodiment 3. FIG. 23 is a schematic view illustrating a bending state of the arms in the horizontal articulated robot of Modification 1 in Embodiment 3.

Figure 22:
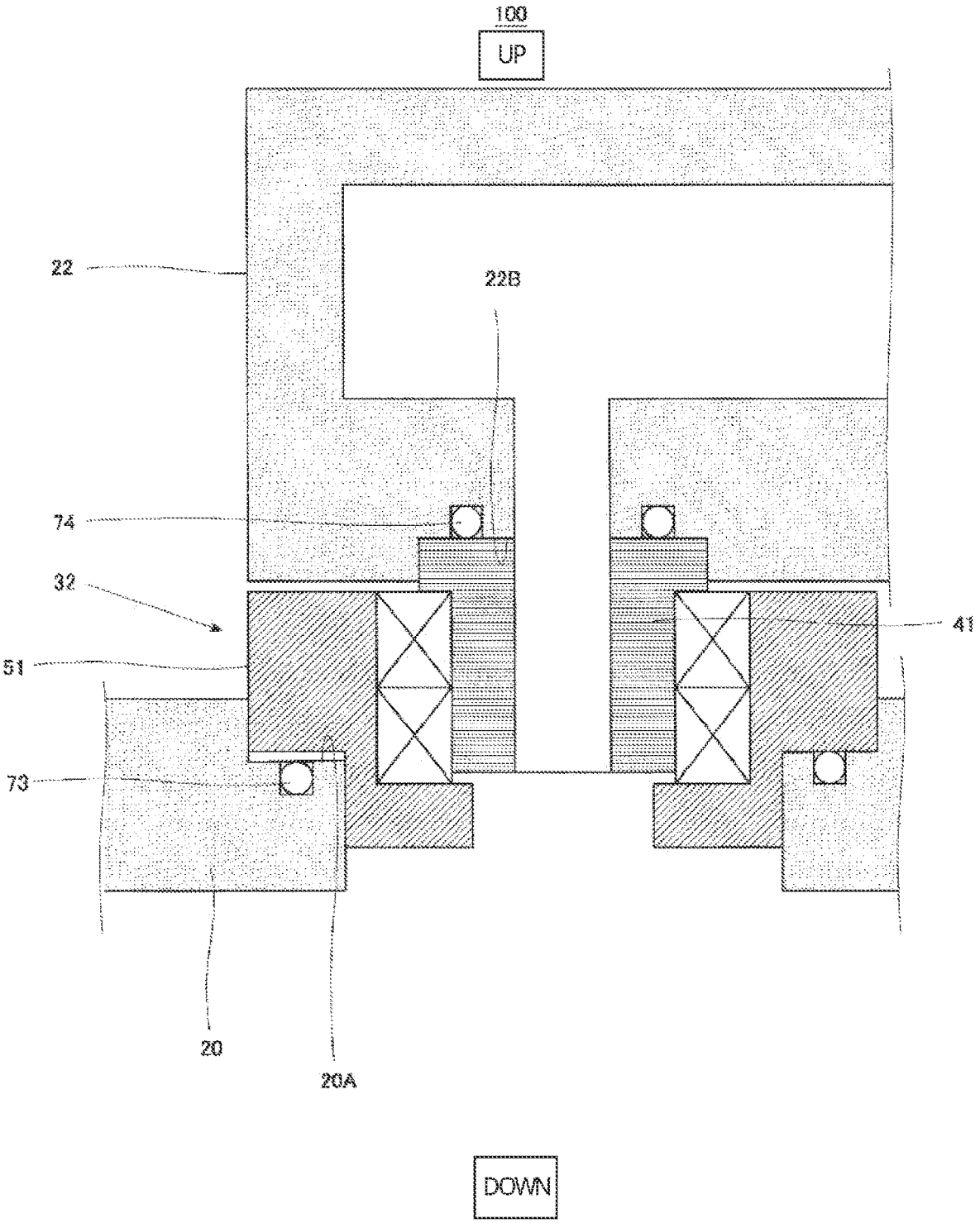
FIG. 22 is a cross-sectional view illustrating an outline configuration near a second connecting part of the horizontal articulated robot of Modification 1 in Embodiment 3.

Note that, in FIGS. 21 and 22, the up-and-down direction in the horizontal articulated robot is expressed as the up-and-down direction in the drawings. Moreover, in FIGS. 21 and 22, in order to facilitate understandings of the present disclosure, a gap is formed between the arm and the shaft member or the bearing member, but if the arm and the shaft member or the bearing member is fastened by a suitable component, the gap will not be formed.

As illustrated in FIG. 21, although the horizontal articulated robot 100 of Modification 1 has the same fundamental configuration as the horizontal articulated robot 100 according to Embodiment 3, it differs in that the second contact surface 22A of the second arm 22 is formed so that it becomes horizontal in the first connecting part 31, when seen horizontally.

Moreover, as illustrated in FIG. 22, the second connecting part 32 has the shaft member 41 and the bearing member 51. The bearing member 51 is placed on the upper end part of the pedestal 20, and is fixed to the pedestal 20 by a suitable component (e.g., bolts). Note that, in the following, a part of the upper end part of the pedestal 20 where the bearing member 51 is placed is referred to as a "third contact surface 20A."

The third contact surface 20A is formed so that it is inclined when seen horizontally. In more detail, the third contact surface 20A is formed so that it is located higher at the tip-end-part side of the pedestal 20 than the base-end-part side. In detail, for example, in terms of correcting the bending of the second arm 22, the third contact surface 20A may be formed so that the end part of the pedestal 20 at the tip-end-part side is located 0.1 to 1.0 mm higher than the end part at the base-end-part side.

Figure 23:
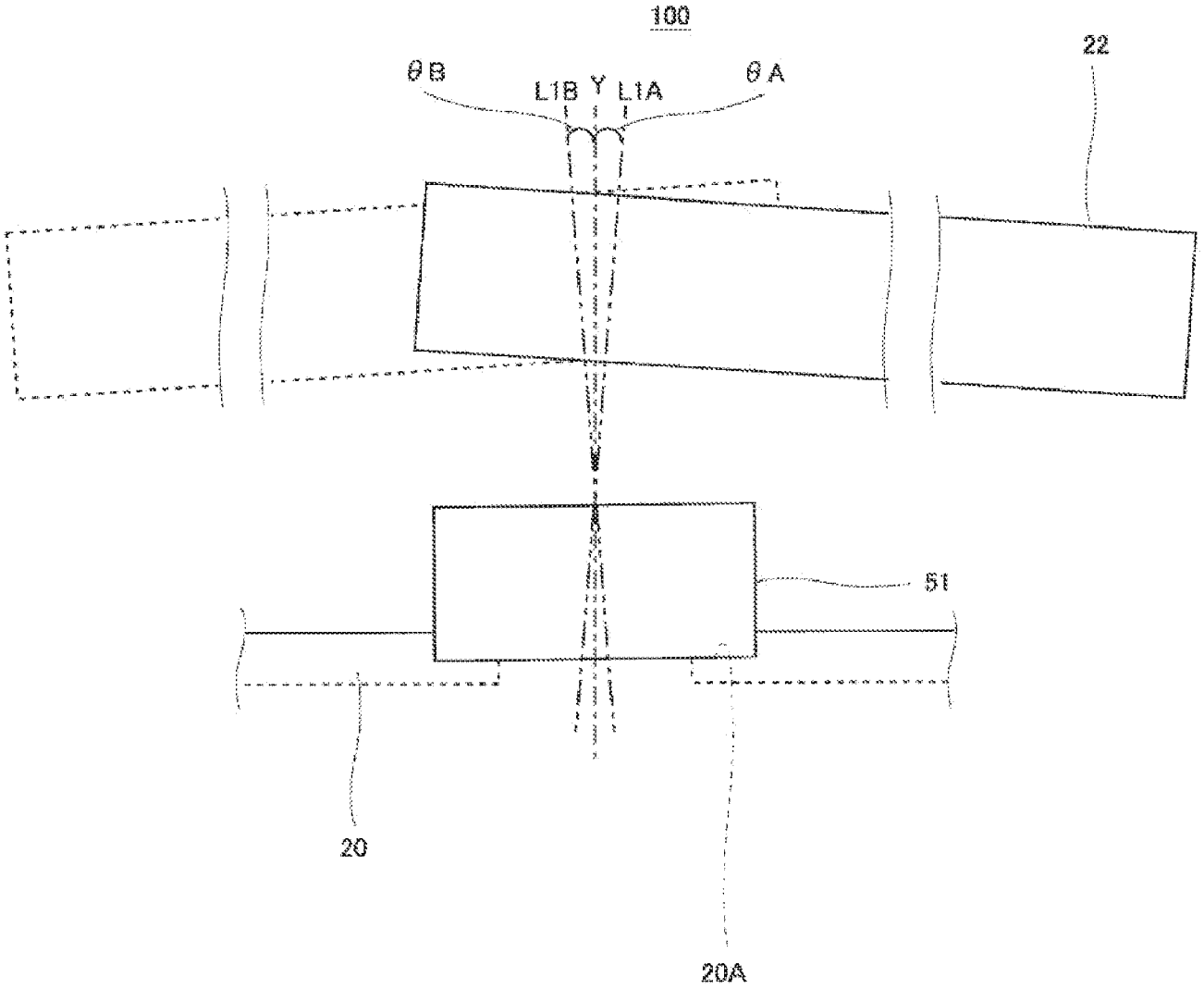
FIG. 23 is a schematic view illustrating a bending state of arms in the horizontal articulated robot of Modification 1 in Embodiment 3.

Moreover, as illustrated in FIG. 23, the third contact surface 20A of the pedestal 20 may be formed so that the angle between the axial center of the second arm 22 at the base-end-part side and the imaginary line Y extending in the vertical direction becomes the given first angle set in advance.

In more detail, the third contact surface 20A is formed so that the angle between the axial center of the second arm 22 at the base-end-part side and the imaginary line becomes the first angle θ, regardless of the posture (rotational angle) of the second arm 22. Here, the first angle θ can be calculated in advance by an experiment etc., and, for example, it may be 0.05° to 0.3°.

Moreover, as illustrated in FIG. 22, the shaft member 41 is fixed at the upper end to the lower end part of the second arm 22 by a suitable component (e.g., bolts). Note that, in the following, a part of the lower end part of the second arm 22 which contacts the upper end surface of the shaft member 41 is referred to as a "first contact surface 22B." The first contact surface 22B is formed so that it may become horizontal, when seen horizontally.

Moreover, the sealing member 73 is disposed on the third contact surface 20A of the pedestal 20. Similarly, the sealing member 74 is disposed on the first contact surface 22B of the second arm 22. As the sealing member 73 and the sealing member 74, O-rings may be used, for example.

The sealing member 73 and the sealing member 74 can maintain an interior space of the second connecting part 32 in a sealed state. Therefore, for example, when the horizontal articulated robot 100 is disposed inside the vacuum chamber, the airtightness of the vacuum chamber can be maintained.

The horizontal articulated robot 100 of Modification 1 configured in this way also demonstrates similar operation and effects to the horizontal articulated robot 100 according to Embodiment 3.

Embodiment 4

The horizontal articulated robot according to Embodiment 4 is based on the horizontal articulated robot according to Embodiment 3, which is configured so that the horizontal articulated robot is suspended from the ceiling, at least one of the first contact surface and the third contact surface is formed so that the tip-end-part side in the extending direction of the arms is located lower, when seen horizontally, as compared with the base-end-part side in the extending direction of the arms.

Alternatively, in the horizontal articulated robot according to Embodiment 4, the second contact surface may be formed so that the tip-end-part side of the arm is located higher, when seen horizontally, as compared with the base-end-part side of the arm.

Below, one example of the horizontal articulated robot according to Embodiment 4 is described with reference to FIGS. 24 to 29.

[Configuration of Horizontal Articulated Robot]

Figure 24:
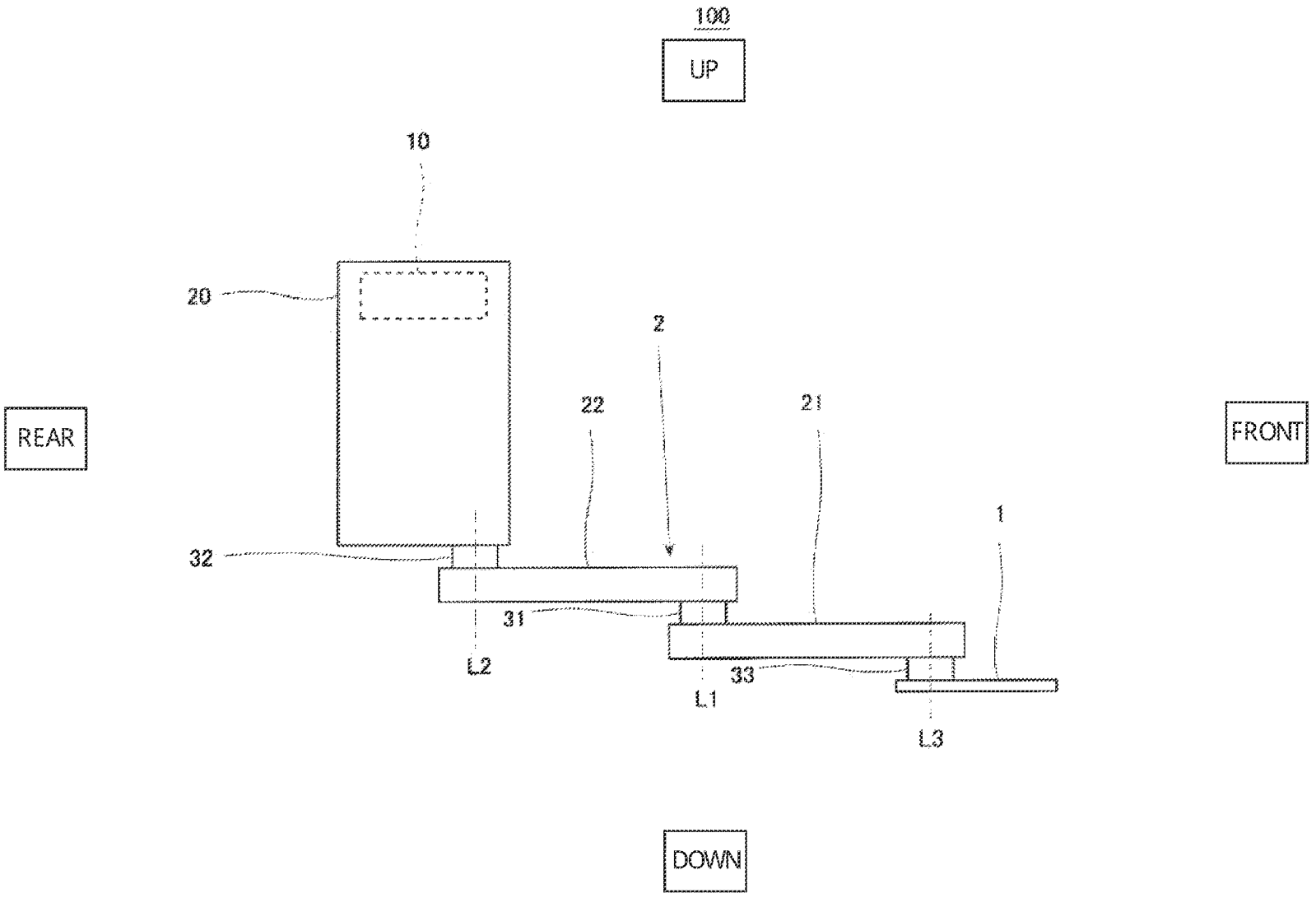
FIG. 24 is a front view schematically illustrating an outline configuration of a horizontal articulated robot according to Embodiment 4.

FIG. 24 is a front view schematically illustrating an outline configuration of the horizontal articulated robot according to Embodiment 4. Note that, in FIG. 24, the up-and-down direction and the front-and-rear direction of the horizontal articulated robot are expressed as the up-and-down direction and the front-and-rear direction illustrated in the drawing.

As illustrated in FIG. 24, the horizontal articulated robot 100 according to Embodiment 4 differs from the horizontal articulated robot 100 according to Embodiment 3 in that it is suspended from the ceiling. Below, the difference between the horizontal articulated robot 100 according to Embodiment 4 and the horizontal articulated robot 100 according to Embodiment 3 is described with reference to FIG. 25.

Figure 25:
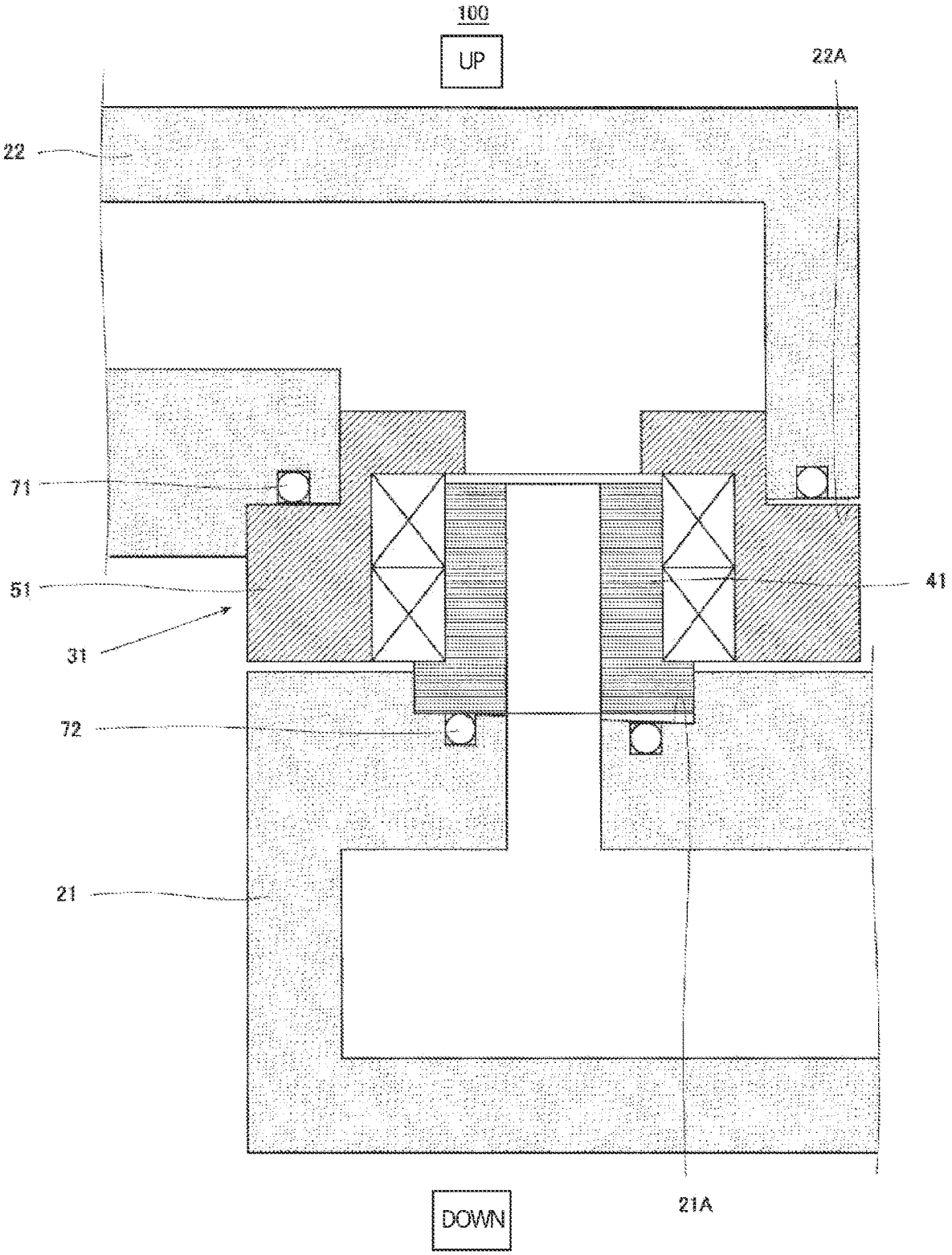
FIG. 25 is a cross-sectional view illustrating an outline configuration of a first connecting part in the horizontal articulated robot illustrated in FIG. 24.

FIG. 25 is a cross-sectional view illustrating an outline configuration of the first connecting part in the horizontal articulated robot illustrated in FIG. 24. Note that, in FIG. 24, in order to facilitate understandings of the present disclosure, a gap is formed between the shaft member or the bearing member and the arm, but if the shaft member or the bearing member and the arm are fastened by a suitable component, the gap will not be formed.

As illustrated in FIG. 25, in the horizontal articulated robot 100 according to Embodiment 4, the upper end part of the bearing member 51 is fixed to the lower end part of the second arm 22 by a suitable component (e.g., bolts).

Moreover, in the horizontal articulated robot 100 according to Embodiment 4, the second contact surface 22A is formed so that it is located higher at the tip-end-part side than the base-end-part side of the second arm 22. In detail, for example, in terms of correcting the bending of the second arm 22, the second contact surface 22A may be formed so that at the tip-end-part side of the end part of the second arm 22 is located 0.1 to 1.0 mm higher than at the base-end-part side of the end part.

Figure 27:
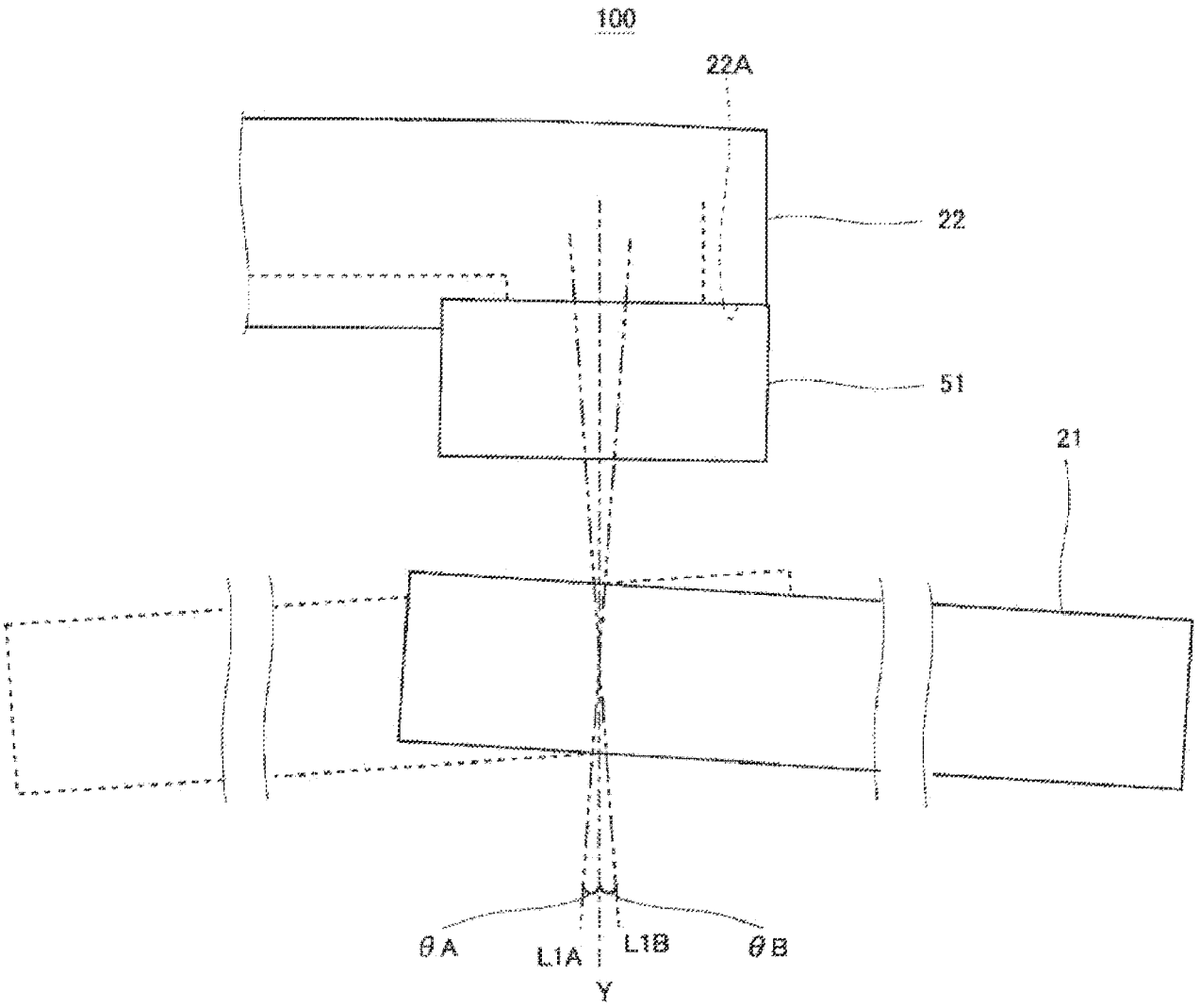
FIG. 27 is a schematic view illustrating a bending state of arms in the horizontal articulated robot according to Embodiment 4.

Moreover, the second contact surface 22A of the second arm 22 may be formed so that the angle between the axial center of the first arm 21 at the base-end-part side and the imaginary line Y extending in the vertical direction becomes the given first angle set in advance (see FIG. 27).

In more detail, the second contact surface 22A is formed so that the angle between the axial center of the first arm 21 at the base-end-part side and the imaginary line Y becomes the first angle, regardless of the posture (rotational angle) of the first arm 21. Here, the first angle θ can be calculated in advance by an experiment etc., and, for example, it may be 0.05° to 0.3°.

Moreover, in the horizontal articulated robot 100 according to Embodiment 4, the lower end part of the shaft member 41 is fixed to the upper end part of the first arm 21 by a suitable component (e.g., bolts).

The first contact surface 21A is formed so that the tip-end-part side of the first arm 21 is located lower, as compared with the base-end-part side of the first arm 21. In detail, for example, in terms of correcting the bending of the first arm 21, the first contact surface 21A may be formed so that the end part at the tip-end-part side of the first arm 21 is located 0.1 to 1.0 mm lower than at the base-end-part side of the end part.

Figure 28:
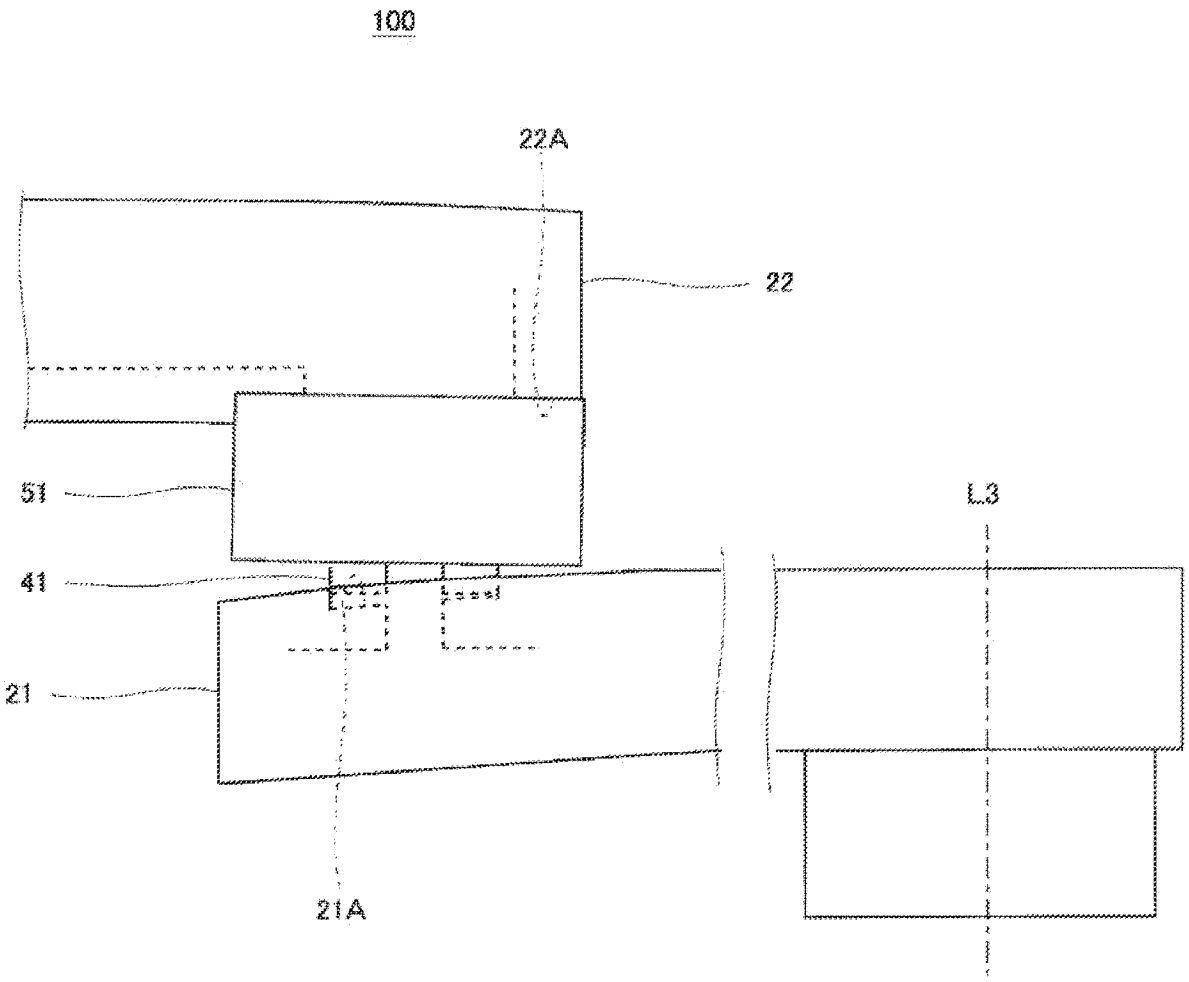
FIG. 28 is a schematic view illustrating a substantial part of the horizontal articulated robot according to Embodiment 4.
Figure 29:
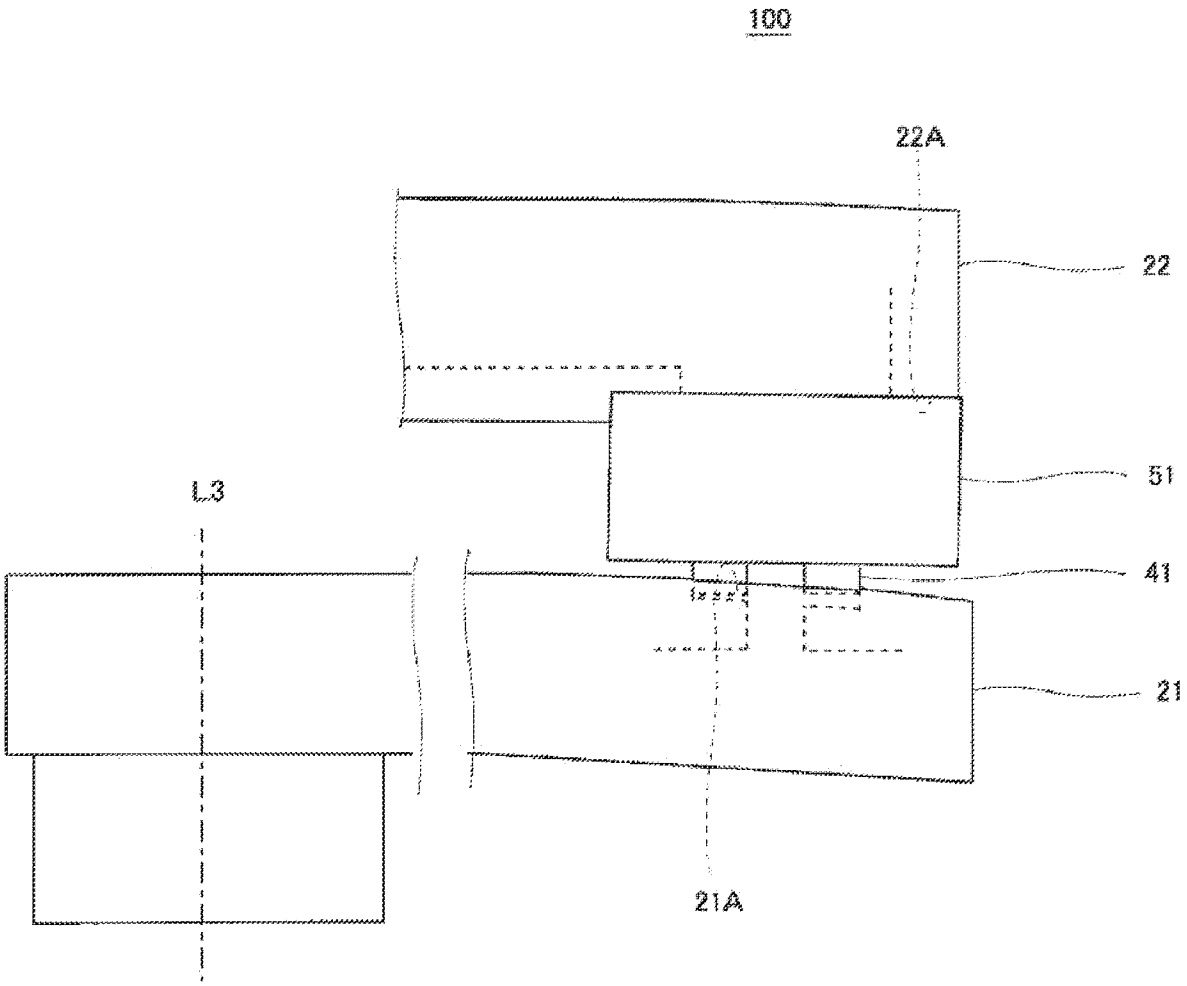
FIG. 29 is a schematic view illustrating the substantial part of the horizontal articulated robot according to Embodiment 4.

Moreover, the first contact surface 21A of the first arm 21 may be formed so that the axial center of the first arm 21 at the tip-end-part side is oriented in the vertical direction, by being inclined (see FIGS. 28 and 29). In more detail, the first contact surface 21A is formed to have the inclination angle so that the axial center of the first arm 21 at the tip-end-part side is oriented in the vertical direction. In other words, the first contact surface 21A may be formed so that the tip-end part of the first arm 21 becomes horizontal, when seen horizontally.

Moreover, the sealing member 71 is disposed on the second contact surface 22A of the second arm 22. Similarly, the sealing member 72 is disposed on the first contact surface 21A of the first arm 21. As the sealing member 71 and the sealing member 72, O-rings may be used, for example.

The sealing member 71 and the sealing member 72 can maintain an interior space of the first connecting part 31 in a sealed state. Therefore, for example, when the horizontal articulated robot 100 is disposed inside the vacuum chamber, the airtightness of the vacuum chamber can be maintained.

Note that, although in the horizontal articulated robot 100 according to Embodiment 4 the first contact surface 21A is formed so that it is inclined, but it is not limited to this configuration. Like the horizontal articulated robot 100 of Modification 1 in Embodiment 3, the third contact surface may be inclined, instead of the first contact surface.

[Operation and Effects of Horizontal Articulated Robot]

Next, operation and effects of the horizontal articulated robot 100 according to Embodiment 4 is described with reference to FIGS. 24 to 29.

Figure 26:
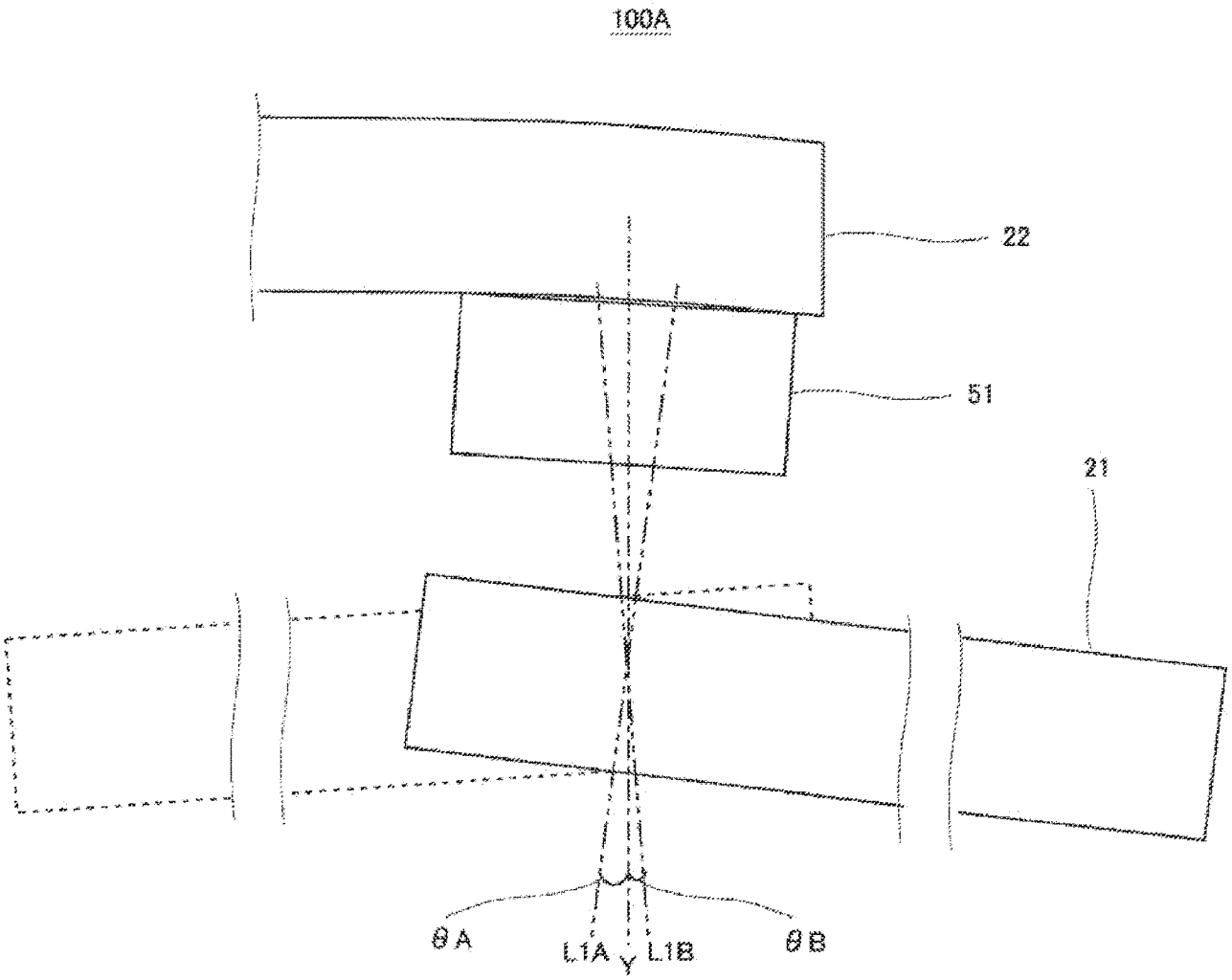
FIG. 26 is a schematic view illustrating a bending state of the arms in the conventional horizontal articulated robot.

FIG. 26 is a schematic view illustrating a bending state of the arms in the conventional horizontal articulated robot. FIG. 27 is a schematic view illustrating a bending state of the arms in the horizontal articulated robot according to Embodiment 4.

As illustrated in FIG. 26, in the conventional horizontal articulated robot 100A, when the tip-end part of the first arm 21 is in the first state, the amount of bending of the first arm 21 is added to the amount of bending of the second arm 22. Therefore, the total amount of bending of the horizontal articulated robot 100A becomes larger when the tip-end part of the first arm 21 is in the first state, as compared with when the tip-end part of the first arm 21 is in the second state.

In other words, the angle θA between the imaginary line Y and the axial center L1A of the base-end part of the first arm 21 when the tip-end part of the first arm 21 is in the first state differs from the angle θB between the imaginary line Y and the axial center L1B of the base-end part of the first arm 21 when the tip-end part of the first arm 21 is in the second state.

That is, in the conventional horizontal articulated robot 100A, the amount of bending varies according to the posture of the robot. Therefore, since the amount of deviation of the taught position coordinates differs depending on the posture of the robot, the teaching work by the operator may become complicated.

On the other hand, as illustrated in FIG. 27, in the horizontal articulated robot 100 according to Embodiment 4, the second contact surface 22A of the second arm 22 is formed so that it is located higher at the tip-end-part side than the base-end-part side of the second arm 22.

Therefore, the bending of the second arm 22 can be corrected, and the effect to the first arm 21 due to the bending of the second arm 22 can be reduced.

Moreover, the amount of bending of the first arm 21 can be reduced when the tip-end part of the first arm 21 is in the first state, as compared with the conventional horizontal articulated robot 100A. Therefore, when the robot operates, the deviation from the taught position coordinates can be reduced, and the lowering in the operating accuracy of the robot can be prevented.

Moreover, as illustrated in FIG. 27, in the horizontal articulated robot 100 according to Embodiment 4, the first ring member 61 is formed so that the angle θA between the imaginary line Y and the axial center L1A of the base-end part of the first arm 21 when the tip-end part of the first arm 21 is in the first state, and the angle θB between the imaginary line Y and the axial center L1B of the base-end part of the first arm 21 when the tip-end part of the first arm 21 is in the second state become the first angle θ.

Therefore, in the horizontal articulated robot 100 according to Embodiment 4, the amount of bending of the first arm 21 becomes the same, regardless of the posture of the robot. Therefore, since the amount of deviation from the taught position coordinates becomes the same regardless of the posture of the robot, the burden of the teaching work by the operator can be reduced.

FIGS. 28 and 29 are schematic views illustrating a substantial part of the horizontal articulated robot according to Embodiment 4.

As illustrated in FIGS. 28 and 29, in the horizontal articulated robot 100 according to Embodiment 4, the first contact surface 21A of the first arm 21 is formed so that the tip-end-part side of the first arm 21 is located lower, as compared with the base-end-part side of the first arm 21.

Therefore, the bending of the first arm 21 can be corrected and the deviation from the taught position coordinates can be reduced. Therefore, the lowering in the operating accuracy of the robot can be prevented.

Moreover, in the horizontal articulated robot 100 according to Embodiment 4, by the first contact surface 21A being inclined, the axial center of the first arm 21 at the tip-end-part side (rotation axis L3) is oriented in the vertical direction. Therefore, the tip-end part of the first arm 21 can be oriented horizontally. Therefore, when the robot operates, the deviation from the taught position coordinates can be reduced, and the lowering in the operating accuracy of the robot can be prevented.

It is apparent for the person skilled in the art that many improvements or other embodiments of the present disclosure are possible from the above description. Therefore, the above description is to be interpreted only as illustration, and it is provided in order to teach the person skilled in the art the best mode that implements the present disclosure. The details of the configurations and/or the functions may substantially be changed without departing from the present disclosure. Moreover, various inventions can be formed by suitable combinations of the plurality of components disclosed in the above embodiments.

INDUSTRIAL APPLICABILITY

Since the horizontal articulated robot of the present disclosure can make the amount of displacement due to the bending of the arms constant to suppress the lowering in the operating accuracy of the robot and increase in the efficiency of the teaching work by the operator, it is useful.

DESCRIPTION OF REFERENCE CHARACTERS

1 Hand
2 Manipulator
10 Control Device
20 Pedestal
20A Third Contact Surface
21 First Arm
21A First Contact Surface
22A Second Contact Surface
22 Second Arm
22B First Contact Surface
31 First Connecting Part
32 Second Connecting Part
33 Third Connecting Part
41 Shaft Member
51 Bearing Member
61 First Ring Member
62 Second Ring Member
63 Third Ring Member
64 Fourth Ring Member
71 Sealing Member
72 Sealing Member
73 Sealing Member
74 Sealing Member
75 Sealing Member
76 Sealing Member
77 Sealing Member
78 Sealing Member
100A Horizontal Articulated Robot
100 Horizontal Articulated Robot
L3 Rotation Axis
L1B Axial Center
L1A Axial Center
Y Imaginary Line
L3 Rotation Axis
L1 Rotation Axis
L2 Rotation Axis

What is claimed is:

1. A horizontal articulated robot having a pedestal and a plurality of arms, comprising:

a first connecting part disposed between two of the arms and rotatably connecting the other arm to one arm;

a second connecting part disposed between the pedestal and the arm and rotatably connecting the arm to the pedestal; and a ring member disposed between the first connecting part and the arm and formed so that, as compared with one of end part sides in an extending direction of the arms, a height dimension thereof becomes larger at the other end part side wherein the ring member has a first ring member disposed between the one arm and the first connecting part, and a second ring member disposed between the first connecting part and the other arm.

2. The horizontal articulated robot of claim 1, wherein the horizontal articulated robot is installed on a floor surface, and wherein the ring member is formed so that the height dimension thereof becomes larger at a tip-end-part side of the arm, as compared with a base-end-part side.

3. The horizontal articulated robot of claim 1, wherein the horizontal articulated robot is suspended from a ceiling, and wherein the ring member is formed so that the height dimension thereof becomes larger at a base-end-part side of the arm, as compared with a tip-end-part side.

4. The horizontal articulated robot of claim 1, wherein the second ring member is formed to have a height dimension so that an axial center of the other arm at a tip-end part side is oriented in the vertical direction.

5. The horizontal articulated robot of claim 1, wherein the first ring member is formed to have a height dimension so that an angle between an axial center of the other arm at a base-end-part side and an imaginary line extending in the vertical direction becomes a given first angle set in advance.

6. The horizontal articulated robot of claim 1, wherein the ring member has a first ring member disposed between the pedestal and the second connecting part, and a second ring member disposed between the first connecting part and the other arm.

7. The horizontal articulated robot of claim 6, wherein the first ring member is formed to have a height dimension so that an angle between an axial center of the one arm at a base-end-part side and an imaginary line extending in the vertical direction becomes a given first angle set in advance.

8. A horizontal articulated robot having a pedestal and a plurality of arms, comprising:

a first connecting part disposed between two of the arms and rotatably connecting the other arm to one arm; and a second connecting part disposed between the pedestal and the arm and rotatably connecting the arm to the pedestal, wherein the first connecting part and the second connecting part are each provided with a shaft member and a bearing member, and wherein at least one of a first contact surface that is a contact surface of the arm with the shaft member, a second contact surface that is a contact surface of the arm with the bearing member, and a third contact surface that is a contact surface of the pedestal with the bearing member is formed so as to be inclined, when seen horizontally, wherein the [first] *second* contact surface is formed so that an angle between an axial center of the other arm at the base-end-part side and an imaginary line extending in the vertical direction becomes a given first angle set in advance.

9. The horizontal articulated robot of claim 8, wherein the [second] *first* contact surface is formed so that an axial center of the other arm at a tip-end part side is oriented in the vertical direction.

10. The horizontal articulated robot of claim 8, wherein the horizontal articulated robot is installed on a floor surface, and wherein at least one of the [first] *second* contact surface and the third contact surface is located higher at a tip-end-part side in an extending direction of the arms, when seen horizontally, as compared with a base-end-part side in the extending direction of the arms.

11. The horizontal articulated robot of claim 8, wherein the [second] *first* contact surface is located lower at a tip-end-part side of the arm, when seen horizontally, as compared with a base-end-part side of the arm.

12. The horizontal articulated robot of claim 8, wherein the horizontal articulated robot is suspended from a ceiling, and wherein at least one of the first contact surface and the third contact surface is located lower at a tip-end-part side in an extending direction of the arms, when seen horizontally, as compared with a base-end-part side in the extending direction of the arms.

13. The horizontal articulated robot of claim 12, wherein the second contact surface is located higher at the tip-end-part side of the arm, when seen horizontally, as compared with the base-end-part side of the arm.

14. The horizontal articulated robot of claim 1, wherein at least one of the first connecting part and the second connecting part is provided with a sealing member configured to seal an interior space of the connecting part.

15. The horizontal articulated robot of claim 8, wherein the third contact surface is formed so that an angle between an axial center of the arm at a base-end-part side and an imaginary line extending in the vertical direction becomes a given first angle set in advance.

* * * * *